(12) United States Patent
Shinozaki et al.

(10) Patent No.: US 9,781,340 B2
(45) Date of Patent: Oct. 3, 2017

(54) IMAGE PROCESSING SYSTEM, INFORMATION PROCESSING DEVICE, INFORMATION STORAGE DEVICE, AND IMAGE PROCESSING METHOD

(71) Applicant: OLYMPUS CORPORATION, Tokyo (JP)

(72) Inventors: Arata Shinozaki, Hachioji (JP); Mitsunori Kubo, Hachioji (JP); Takayuki Nakatomi, Chofu (JP)

(73) Assignee: OLYMPUS CORPORATION, Tokyo (JP)

( * ) Notice: Subject to any disclaimer, the term of this patent is extended or adjusted under 35 U.S.C. 154(b) by 440 days.

(21) Appl. No.: 14/164,428

(22) Filed: Jan. 27, 2014

(65) Prior Publication Data

US 2014/0139624 A1    May 22, 2014

Related U.S. Application Data

(63) Continuation of application No. PCT/JP2012/068057, filed on Jul. 17, 2012.

(30) Foreign Application Priority Data

Jul. 27, 2011    (JP) .................. 2011-164062

(51) Int. Cl.
*H04N 5/232* (2006.01)
*G06T 3/40* (2006.01)
*H04N 5/262* (2006.01)

(52) U.S. Cl.
CPC ....... *H04N 5/23238* (2013.01); *G06T 3/4038* (2013.01); *H04N 5/23232* (2013.01); *H04N 5/2624* (2013.01)

(58) Field of Classification Search
CPC ............. H04N 5/23238; H04N 5/2624; H04N 5/23232; H04N 5/232; G06T 3/4038
(Continued)

(56) References Cited

U.S. PATENT DOCUMENTS 5,565,948 A * 10/1996 Kume ................... G03B 13/14
396/377
6,243,103 B1 * 6/2001 Takiguchi ............. G06T 3/4038
345/634

(Continued)

FOREIGN PATENT DOCUMENTS

JP    09-322055 A    12/1997
JP    10-126665 A    5/1998
(Continued)

OTHER PUBLICATIONS

English Abstract of JP 2000-156818 dated Jun. 6, 2000.
(Continued)

*Primary Examiner* — Andy Rao
*Assistant Examiner* — Zaihan Jiang
(74) *Attorney, Agent, or Firm* — Scully, Scott, Murphy & Presser, P.C.

(57) ABSTRACT

An image processing system includes an image acquisition section that consecutively acquires still images, a direction determination section that determines a camera moving direction, a slit image generation section that generates slit images based on the consecutively acquired still images, and a panoramic image generation section that performs a synthesis process of the slit images to generate a panoramic image. The direction determination section determines whether the camera moving direction is a first camera moving direction or a second camera moving direction when the imaging section is moved during capture. The panoramic image generation section performs the synthesis process of
(Continued)

each slit image based on the camera moving direction when the consecutively acquired still images were captured to generate the panoramic image.

3 Claims, 17 Drawing Sheets

(58) Field of Classification Search
USPC .......................................................... 348/38
See application file for complete search history.

(56) References Cited

U.S. PATENT DOCUMENTS

| | | | |
|---|---|---|---|
| 6,389,179 | B1 | 5/2002 | Katayama et al. |
| 6,788,828 | B2 | 9/2004 | Katayama et al. |
| 2002/0047895 | A1* | 4/2002 | Bernardo ................ G01C 11/02 348/48 |
| 2006/0018547 | A1* | 1/2006 | Ouchi .................... G06T 7/0024 382/190 |
| 2008/0024594 | A1* | 1/2008 | Ritchey ................ H04N 5/2254 348/36 |
| 2008/0253687 | A1* | 10/2008 | Zhang ................ H04N 5/23232 382/284 |

FOREIGN PATENT DOCUMENTS

| | | |
|---|---|---|
| JP | 3466493 A | 11/2003 |
| JP | 2006-345400 A | 12/2006 |
| JP | 2008-167092 A | 7/2008 |
| JP | 2010-028764 A | 2/2010 |
| JP | 4611231 A | 1/2011 |
| JP | 2011-078132 A | 4/2011 |
| JP | 2012-070329 A | 4/2012 |
| WO | WO 2008087721 A1 | 7/2008 |
| WO | WO 2013015147 A1 | 1/2013 |

OTHER PUBLICATIONS

English Abstract and translation of JP 2007-267008 dated Oct. 11, 2007.

International Search Report dated Sep. 25, 2012 issued in PCT/JP2012/068057.

* cited by examiner

FIG. 3A
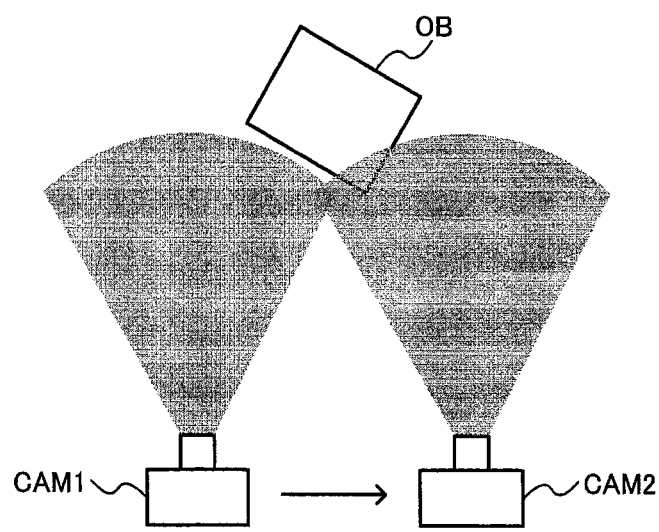
FIG. 3B  FIG. 3C
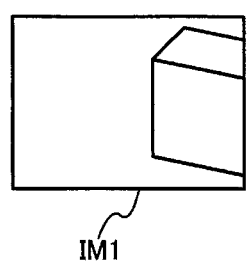 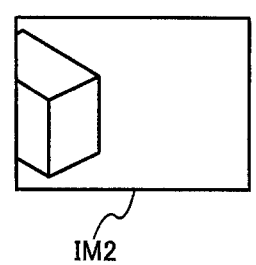

IMAGE PROCESSING SYSTEM, INFORMATION PROCESSING DEVICE, INFORMATION STORAGE DEVICE, AND IMAGE PROCESSING METHOD

CROSS REFERENCE TO RELATED APPLICATION

This application is a continuation of International Patent Application No. PCT/JP2012/068057, having an international filing date of Jul. 17, 2012, which designated the United States, the entirety of which is incorporated herein by reference. Japanese Patent Application No. 2011-164062 filed on Jul. 27, 2011 is also incorporated herein by reference in its entirety.

BACKGROUND

The present invention relates to an image processing system, an information processing device, an information storage device, an image processing method, and the like.

In recent years, a technique that generates a panoramic image using a digital camera has been developed. A panoramic image is normally generated by stitching a plurality of still images captured while moving an imaging section in one direction.

JP-A-2010-28764 discloses a technique that generates a panoramic image based on slits extracted from consecutively captured images to increase the consecutive shooting speed and the slit synthesis speed while eliminating discontinuity during image synthesis.

Japanese Patent No. 3466493 discloses a method that generates a panoramic image that is mainly used for navigation applications. The method disclosed in Japanese Patent No. 3466493 extracts slits from consecutive images captured using an on-board stationary camera to synthesize a panoramic image. The method disclosed in Japanese Patent No. 3466493 makes it unnecessary to employ an image synthesis process based on a feature point that increases the processing load, and can generate a panoramic image at a higher speed.

According to the panoramic synthesis method disclosed in JP-A-2010-28764 or Japanese Patent No. 3466493, a panoramic image can be synthesized taking account of motion parallax by stitching trimmed rectangular areas (slits).

SUMMARY

According to one aspect of the invention, there is provided an image processing system comprising:

an image acquisition section that consecutively acquires still images;

a direction determination section that determines a camera moving direction, the camera moving direction being a moving direction of an imaging section during capture;

a slit image generation section that generates slit images based on the consecutively acquired still images; and a panoramic image generation section that performs a synthesis process of the slit images to generate a panoramic image, the direction determination section determining whether the camera moving direction is a first camera moving direction or a second camera moving direction that differs from the first camera moving direction when the imaging section is moved during capture, and the panoramic image generation section determining a synthesis position of a slit image among the slit images based on the camera moving direction when the consecutively acquired still images were captured, and performing the synthesis process of the slit image to generate the panoramic image.

According to another aspect of the invention, there is provided an information processing device comprising:

a direction determination section that determines a camera moving direction, the camera moving direction being a moving direction of an imaging section during capture;

a panoramic image generation section that performs a synthesis process of slit images generated based on still images consecutively acquired by an image acquisition section to generate a panoramic image; and a storage section that stores the slit images and the generated panoramic image, the direction determination section determining whether the camera moving direction is a first camera moving direction or a second camera moving direction that differs from the first camera moving direction when the imaging section is moved during capture, and the panoramic image generation section determining a synthesis position of a slit image among the slit images generated based on the consecutively acquired still images, based on the camera moving direction when the consecutively acquired still images were captured, and performing the synthesis process of the slit image to generate the panoramic image.

According to another aspect of the invention, there is provided a computer-readable storage device with an executable program stored thereon, wherein the program instructs a computer to perform steps of:

determining a camera moving direction, the camera moving direction being a moving direction of an imaging section during capture;

performing a synthesis process of slit images generated based on consecutively acquired still images to generate a panoramic image;

determining whether the camera moving direction is a first camera moving direction or a second camera moving direction that differs from the first camera moving direction when the imaging section is moved during capture;

determining a synthesis position of a slit image among the slit images generated based on the consecutively acquired still images based on the camera moving direction when the consecutively acquired still images were captured; and performing the synthesis process of the slit image to generate the panoramic image.

According to another aspect of the invention, there is provided an image processing method comprising:

consecutively acquiring still images;

determining whether a camera moving direction is a first camera moving direction or a second camera moving direction that differs from the first camera moving direction when an imaging section is moved during capture, the camera moving direction being a moving direction of the imaging section during capture;

generating slit images based on the consecutively acquired still images;

determining a synthesis position of a slit image among the slit images based on the camera moving direction when the consecutively acquired still images were captured; and performing a synthesis process of the slit image to generate a panoramic image.

BRIEF DESCRIPTION OF THE DRAWINGS

FIGS. 3A to 3C are views illustrating a difference in perspective due to motion parallax.

DESCRIPTION OF EXEMPLARY EMBODIMENTS

Figure 1:
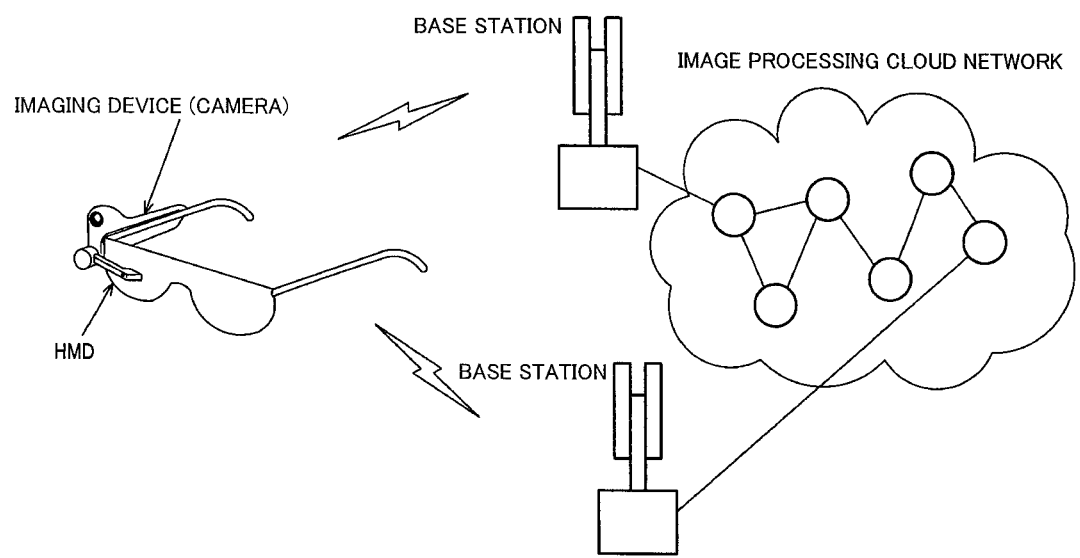
FIG. 1 illustrates a system configuration example according to one embodiment of the invention.

JP-A-2010-28764 and Japanese Patent No. 3466493 disclose a technique that generates a panoramic image by moving the imaging section in one direction, but do not disclose a technique that generates a panoramic image by moving the imaging section in a plurality of directions.

Several embodiments of the invention may provide an image processing system, an information processing device, an information storage device, an image processing method, and the like that can generate a panoramic image based on a slit image when the imaging section is moved in a plurality of directions during capture.

Several embodiments of the invention may provide an image processing system, an information processing device, an information storage device, an image processing method, and the like that can generate a panoramic image based on a slit image and a positioning slit when the imaging section is moved in a plurality of directions during capture.

According to the above configuration, when the imaging section is moved in a plurality of camera moving directions during capture, still images used to generate the slit images are consecutively acquired, and the current camera moving direction is determined. The slit image is generated based on a still image among the consecutively acquired still images. The synthesis position of the slit image is determined based on the camera moving direction, and the synthesis process is then performed. It is possible to generate a panoramic image of which the angle of view is wider in a plurality of directions than that of a panoramic image generated by moving the imaging section in one camera moving direction while reducing a difference in perspective due to motion parallax by utilizing the slit images.

The image processing system may further comprise:

a positioning slit generation section that generates a positioning slit based on a still image among the consecutively acquired still images, the panoramic image generation section may determine the synthesis position of the slit image based on the camera moving direction when the consecutively acquired still images were captured, and the positioning slit, and may perform the synthesis process of the slit image to generate the panoramic image.

According to the above configuration, since a problem does not occur even when one slit image has an overlapping area with a plurality of slit images, the overlapping area can be relatively easily specified, for example.

In the image processing system, the positioning slit generation section may generate the positioning slit so that a long side of the slit image is orthogonal to a long side of the positioning slit.

According to the above configuration, the overlapping area can be specified so that the short side of the slit image coincides with the long side of the positioning slit, for example.

In the image processing system, the positioning slit generation section may set a first area and a second area based on a straight line that passes through a center of the still image, may generate a first positioning slit from the first area, and may generate a second positioning slit from the second area.

The above configuration makes it possible to selectively use the first positioning slit or the second positioning slit when specifying the overlapping area of the slit images, for example. Specifically, it is possible to select the positioning slit corresponding to the camera moving direction, and determine the overlapping area even when the imaging section is moved in an arbitrary direction, for example.

In the image processing system, the positioning slit generation section may change an extraction position of the positioning slit within the still image based on motion information about the imaging section acquired from a motion information acquisition section, and may generate the positioning slit.

The above configuration makes it possible to extract the positioning slit from the same position as that of the previously used positioning slit when the position of the imaging section has changed to a large extent, and efficiently perform the search process that searches the overlapping area of the synthesis target image and the positioning slit, for example.

In the image processing system, the panoramic image generation section may shift the synthesis position in a direction perpendicular to the first camera moving direction when it has been determined that the camera moving direction is the second camera moving direction, and may perform the synthesis process so that part of the positioning slit overlaps part of the slit image to generate the panoramic image.

The above configuration makes it possible to generate a panoramic image that covers a wide range of the imaging area in the vertical direction and the horizontal direction when the imaging section was moved along a zigzag path, for example.

In the image processing system, the direction determination section may determine the camera moving direction when the imaging section is moved in the first camera moving direction, moved in a third camera moving direction that differs from the first camera moving direction and the second camera moving direction, and then moved in the second camera moving direction during capture, and the panoramic image generation section may use the positioning slit generated based on the still image acquired when the camera moving direction is the first camera moving direction for the synthesis process when the positioning slit was generated from an area of the still image assigned in the third camera moving direction relative to a center of the still image, and may use the positioning slit generated based on the still image acquired when the camera moving direction is the second camera moving direction for the synthesis process when the positioning slit was generated from an area of the still image assigned in a direction opposite to the third camera moving direction relative to the center of the still image.

The above configuration makes it possible to specify the positioning slit by which the slit image can be synthesized so that the angle of view of the synthesized image is sufficiently larger than the angle of view of the original slit image.

In the image processing system, the panoramic image generation section may limit a search range for a position of an overlapping area of the positioning slit and the slit image based on motion information about the imaging section acquired from a motion information acquisition section, and may perform the synthesis process.

The above configuration makes it possible to limit the overlapping area search range to an area around the position estimated based on the motion information after the imaging section has been moved, and perform the process that specifies the overlapping area at high speed (i.e., reduce the load of the process that specifies the overlapping area), for example.

In the image processing system, the panoramic image generation section may limit the search range for the position of the overlapping area of the positioning slit and the slit image based on a horizontal component or a vertical component of the motion information about the imaging section acquired from the motion information acquisition section, and may perform the synthesis process.

According to the above configuration, the search range can be limited relative to the positioning slit.

In the image processing system, the slit image generation section may generate the slit images that have a long side along a direction corresponding to a horizontal component or a vertical component, whichever is smaller in absolute value, of a vector that indicates the camera moving direction.

The above configuration makes it possible to generate a slit image that does not include an area of the still image in the camera moving direction and an area of the still image in the direction opposite to the camera moving direction, and suppress the effects of a difference in perspective due to motion parallax, for example.

In the image processing system, the slit image generation section may generate the slit images that have the long side along the direction corresponding to the horizontal component or the vertical component, whichever is smaller in absolute value, of the vector that indicates the camera moving direction, and include a center of a still image among the consecutively acquired still images.

The above configuration makes it possible to generate a slit image that does not include an area of the still image in the camera moving direction and an area of the still image in the direction opposite to the camera moving direction, and includes the center of the still image, and further suppress the effects of a difference in perspective due to motion parallax, for example.

In the image processing system, the panoramic image generation section may perform the synthesis process of the slit image so that the slit image has an overlapping area with the slit image that was used for a preceding synthesis process in the camera moving direction when the slit image used for the preceding synthesis process was captured to generate the panoramic image.

The above configuration makes it possible to perform the synthesis process while making the generated slit images overlap in the camera motion direction.

In the image processing system, the direction determination section may determine whether the camera moving direction is the first camera moving direction, the second camera moving direction, or a third camera moving direction that differs from the first camera moving direction and the second camera moving direction when the imaging section is moved during capture.

The above configuration makes it possible to generate the panoramic image by moving the imaging section along a zigzag path.

In the image processing system, the panoramic image generation section may perform a process that synthesizes the slit images in the first camera moving direction and a process that synthesizes the slit images in the second camera moving direction in parallel.

According to the above configuration, since the slit images can be synthesized in the second camera moving direction even when the slit images have not been completely synthesized in the first camera moving direction, it is possible to prevent a situation in which the process that synthesizes the slit images in the first camera moving direction becomes a bottleneck, and the panoramic image generation process can be performed at high speed, for example.

In the image processing system, the panoramic image generation section may perform the synthesis process of the slit image based on a first error tolerance, and may then perform the synthesis process of the slit image based on a second error tolerance that is lower than the first error tolerance.

According to the above configuration, the overlapping area of the slit image can be specified based on the first error tolerance, and the accuracy of the synthesis position of the slit image can be improved based on the second error tolerance, for example.

In the image processing system, the image acquisition section may stop acquisition of the still images when motion information about the imaging section has been acquired from motion information acquisition section, and it has been determined that an overlapping area of consecutive slit images among the slit images has not occurred in the synthesis process of the slit image based on the motion information.

The above configuration makes it possible to prevent a situation in which the still images are consecutively acquired although consecutive slit images do not have an overlapping area, and a panoramic image cannot be generated, for example.

In the image processing system, the image acquisition section may increase an image acquisition rate so that an overlapping area of consecutive slit images among the slit images is larger than a given threshold value during the synthesis process of the slit image when it has been determined that a camera moving speed has increased based on motion information about the imaging section acquired from a motion information acquisition section, the camera moving speed being a moving speed of the imaging section.

The above configuration makes it possible to obtain the slit images having an overlapping area necessary for synthesizing the panoramic image.

In the image processing system, the slit image generation section may increase a width of the slit image so that an overlapping area of consecutive slit images among the slit images is larger than a given threshold value during the synthesis process of the slit image when it has been determined that a camera moving speed has increased based on motion information about the imaging section acquired from a motion information acquisition section, the camera moving speed being a moving speed of the imaging section.

The above configuration makes it possible to obtain the slit images having an overlapping area necessary for synthesizing the panoramic image even when the image acquisition rate (sampling rate) cannot be increased due to limitations to the hardware or the network, for example.

In the image processing system, the image acquisition section may control a shutter release timing of the imaging section to consecutively acquire the still images.

The above configuration makes it possible to cause the number of still images captured by the imaging section to coincide with the number of still images acquired by the image acquisition section, and cause the image acquisition section to acquire the desired number of still images while preventing a situation in which the imaging section captures unnecessary still images, for example.

In the information processing device, the storage section may store a positioning slit generated by a positioning slit generation section based on a still image among the consecutively acquired still images, and the panoramic image generation section may determine the synthesis position of the slit image based on the camera moving direction when the consecutively acquired still images were captured, and the positioning slit, and may perform the synthesis process of the slit image to generate the panoramic image.

In the information processing device, the panoramic image generation section may shift the synthesis position in a direction perpendicular to the first camera moving direction when it has been determined that the camera moving direction is the second camera moving direction, and may perform the synthesis process so that part of the positioning slit overlaps part of the slit image to generate the panoramic image.

In the information processing device, the slit images may have a long side along a direction corresponding to a horizontal component or a vertical component, whichever is smaller in absolute value, of a vector that indicates the camera moving direction, and may include a center of a still image among the consecutively acquired still images.

In the information processing device, the panoramic image generation section may perform the synthesis process of the slit image so that the slit image has an overlapping area with the slit image that was used for a preceding synthesis process in the camera moving direction when the slit image used for the preceding synthesis process was captured to generate the panoramic image.

Exemplary embodiments of the invention are described below. An outline and a system configuration example will be described first. A specific embodiment and a method will then be described. The flow of a process will then be described using a flowchart. Note that the following exemplary embodiments do not in any way limit the scope of the invention laid out in the claims. Note also that all of the elements described below in connection with the following exemplary embodiments should not necessarily be taken as essential elements of the invention.

1. Outline

In recent years, a technique that generates a panoramic image using a digital camera has been developed. A panoramic image is normally generated by stitching a plurality of still images captured while moving an imaging section in one direction.

When an image is captured while moving the imaging section, a difference in perspective due to motion parallax may occur in the captured still images (see FIGS. 3A to 3C). In this case, the still images may not be successfully synthesized due to the difference in perspective, and it may be difficult to generate a panoramic image. In order to reduce the effects of a difference in perspective, a technique that extracts a slit image from a still image, and generates a panoramic image using the slit image has been developed. For example, JP-A-2010-28764 and Japanese Patent No. 3466493 disclose such a technique.

JP-A-2010-28764 discloses a technique that generates a panoramic image based on slits extracted from consecutively captured images to increase the consecutive camera moving speed and the slit synthesis speed while eliminating discontinuity during image synthesis.

Japanese Patent No. 3466493 discloses a method that generates a panoramic image that is mainly used for navigation applications. The method disclosed in Japanese Patent No. 3466493 extracts slits from consecutive images captured using an on-board stationary camera to synthesize a panoramic image. The method disclosed in Japanese Patent No. 3466493 makes it unnecessary to employ an image synthesis process based on a feature point that increases the processing load, and can generate a panoramic image at a higher speed.

According to the panoramic synthesis method disclosed in JP-A-2010-28764 or Japanese Patent No. 3466493, a panoramic image can be synthesized taking account of motion parallax by stitching trimmed rectangular areas (slits).

However, JP-A-2010-28764 and Japanese Patent No. 3466493 disclose a technique that generates a panoramic image by moving the imaging section in one direction, but do not disclose a technique that generates a panoramic image by moving the imaging section in a plurality of directions.

A technique that generates a panoramic image by moving the imaging section in one direction has a problem in that the angle of view of the panoramic image can be adjusted only in the moving direction of the imaging section. For example, the angle of view of the panoramic image cannot be increased in the direction perpendicular to the moving direction of the imaging section.

If still images captured while moving the imaging section in a plurality of directions can be provided by moving the imaging section in a plurality of directions during capture, it is possible to generate a panoramic image of which the angle of view is increased in a plurality of directions.

According to several embodiments of the invention, when the imaging section is moved in a plurality of camera moving directions during capture, still images are consecutively acquired, slit images are extracted from the consecutively acquired still images, and a panoramic image is generated based on the extracted slit images.

Since the overlapping area of the slit images is smaller than the overlapping area of the still images, it may be difficult to specify the overlapping area of the slit images. According to several embodiments of the invention, a positioning slit is extracted from the still image in addition to the slit image, and a panoramic image is generated based on the slit image and the positioning slit in order to deal with the above problem.

2. System Configuration Example

FIG. 1 illustrates a configuration example of an image processing system according to one embodiment of the invention. In one embodiment of the invention, the image processing system is a server on an image processing cloud network. The image processing system may include a head mounted display (HMD), an imaging device (camera), and the like in addition to the image processing cloud network. The image processing system may be an information processing device included in an HMD or the like.

In one embodiment of the invention, the user captures the object using an imaging device included in (provided to) an HMD while shaking his/her head to generate still images (or slit images or a movie), which are transmitted to the server on the image processing cloud network through a base station via wireless communication. The server generates a panoramic image, and the user views the panoramic image on the HMD.

Note that the embodiments of the invention are for illustrative purposes only, and the image processing system is not limited to the configuration illustrated in FIG. 1. For example, various modifications may be made, such as omitting some of the elements illustrated in FIG. 1, or adding other elements. Note that the still image or the like need not necessarily be transmitted to the image processing system via wireless communication, but may be transmitted to the image processing system via cable communication. When the image processing system is an information processing device that is included in the HMD, the image processing system need not necessarily receive the still image or the like through a network, but may acquire the still image or the like through an internal bus or the like. The imaging device need not necessarily be integrated with the HMD, but may be a handheld camera or the like. The output device (e.g., HMD) need not necessarily be provided.

Figure 2:
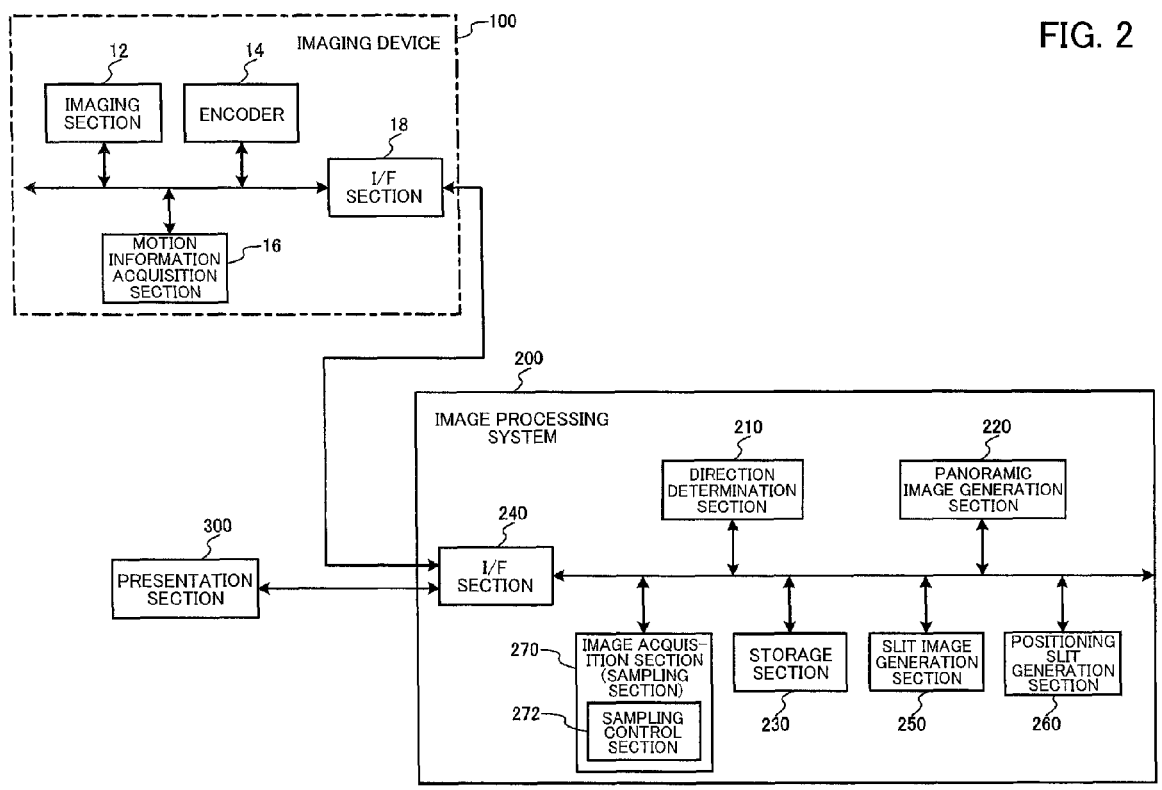
FIG. 2 illustrates a detailed system configuration example according to one embodiment of the invention.

FIG. 2 illustrates a detailed configuration example of the image processing system according to one embodiment of the invention. An image processing system 200 illustrated in FIG. 2 includes a direction determination section 210, a panoramic image generation section 220, a storage section 230, an I/F section 240, a slit image generation section 250, a positioning slit generation section 260, and an image acquisition section (sampling section) 270. Note that the image processing system 200 is not limited to the configuration illustrated in FIG. 2. Various modifications may be made, such as omitting some of the elements illustrated in FIG. 2, or adding other elements. For example, the image processing system 200 may be implemented by a plurality of information processing devices.

The image processing system 200 is connected to an imaging device 100 and a presentation section 300. Examples of the imaging device 100 include a camera included in an HMD and the like. Examples of the image processing system 200 include a server on an image processing cloud network, and the like. Examples of the presentation section 300 include an HMD and the like.

The imaging device 100 includes an imaging section 12, an encoder 14, a motion information acquisition section 16, and an I/F section 18. Note that the imaging device 100 is not limited to the configuration illustrated in FIG. 2. Various modifications may be made, such as omitting some of the elements illustrated in FIG. 2, or adding other elements.

The connection relationship between the above sections is described below. In the imaging device 100, the imaging section 12, the encoder 14, the motion information acquisition section 16, and the I/F section 18 are connected through an internal bus. In the image processing system 200, the direction determination section 210, the panoramic image generation section 220, the storage section 230, the I/F section 240, the slit image generation section 250, the positioning slit generation section 260, and the image acquisition section (sampling section) 270 are connected through an internal bus.

A process performed by each section of the imaging device 100 is described below.

The imaging section (camera) 12 captures the object. The imaging section 12 includes an image sensor (e.g., CCD) and an optical system. The imaging section 12 may include a device (processor) that is used for image processing and the like.

The encoder 14 encodes a movie captured by the imaging section 12 using a video codec (e.g., MPEG codec). The function of the encoder 14 may be implemented by hardware such as a processor (e.g., CPU) or an ASIC (e.g., gate array), a program, or the like.

The motion information acquisition section 16 acquires motion information about the imaging section 12. The motion information acquisition section 16 may be a sensor such as an orientation sensor (e.g., terrestrial magnetism sensor), an acceleration sensor, or a gyro sensor. The motion information acquisition section 16 may acquire sensor information obtained by the sensor as the motion information about the imaging section 12. The orientation sensor is a terrestrial magnetism sensor or the like, and measures the orientation (angle (0 to 360°)) of the sensor. The terrestrial magnetism sensor includes a device that changes in resistance value or impedance value depending on the strength of a magnetic field, for example. The terrestrial magnetism sensor detects triaxial terrestrial magnetism information. The acceleration sensor includes a device that changes in resistance value depending on the external force, for example. The acceleration sensor detects triaxial acceleration information. The gyro sensor detects triaxial angular velocity information. A sensor that functions as the terrestrial magnetism sensor, the acceleration sensor, and/or the gyro sensor may also be used. The motion information acquisition section 16 may use position information obtained by a GPS as the motion information about the imaging section 12.

The motion information acquisition section 16 may acquire the amount of change in the imaging range or the like that can be specified from an internal camera parameter as the motion information about the imaging section 12. The motion information acquisition section 16 may acquire a motion vector as the motion information, the motion vector being obtained when the encoder 14 encodes the movie captured by the imaging section 12. The motion information acquisition section 16 may calculate the motion information using a tracking algorithm (e.g., optical flow analysis).

The I/F section 18 notifies the image processing system 200 of the information acquired from the imaging section 12, the encoder 14, and the motion information acquisition section 16.

A process performed by each section of the image processing system 200 is described below.

The direction determination section 210 determines a camera moving direction (described later).

The panoramic image generation section 220 generates a panoramic image based on the slit images acquired from the slit image generation section 250 (described later).

The storage section 230 stores a database, and serves as a work area for the panoramic image generation section 220 and the like. The function of the storage section 230 may be implemented by a memory (e.g., RAM), a hard disk drive (HDD), or the like. The storage section 230 may store the still images acquired from the I/F section 240 or the image acquisition section (sampling section) 270 (described later), the slit images acquired from the slit image generation section 250, positioning slits acquired from the positioning slit generation section 260, the panoramic image generated by the panoramic image generation section 220, and the like.

The I/F section 240 handles information communication between the image processing system 200 and the imaging device 100, and information communication between the image processing system 200 and the presentation section 300. Note that the I/F section 240 may perform communication via cable communication or wireless communication.

The slit image generation section 250 generates the slit images based on the still images acquired from the image acquisition section 270 (described later).

The positioning slit generation section 260 generates the positioning slits based on the still images acquired from the image acquisition section 270 (described later).

The image acquisition section (sampling section) 270 acquires still images from the information acquired from the I/F section 240, and outputs a series of still images to each functional section. The image acquisition section (sampling section) 270 may include a sampling control section 272.

When the I/F section 240 has acquired information including a movie captured by the imaging device 100, the image acquisition section (sampling section) 270 samples still images from the captured movie at an image acquisition rate (sampling rate) set by the sampling control section 272, and outputs a series of still images to each functional section.

When the I/F section 240 has acquired information including a series of still images, the image acquisition section 270 acquires the series of still images, and outputs the series of still images to each functional section. The series of still images may have been generated by an arbitrary method. For example, the imaging device 100 may have consecutively captured (generated) the series of still images, or the imaging device 100 may have captured a movie, and sampled (generated) the series of still images from the movie.

The sampling control section 272 sets the image acquisition rate (sampling rate). When the imaging device 100 consecutively captures still images, the sampling control section 272 may output the sampling rate and the like to the I/F section 18 of the imaging device 100 so that the sampling rate set by the sampling control section 272 can be used as the shutter speed or the capture interval.

The functions of the direction determination section 210, the panoramic image generation section 220, the slit image generation section 250, the positioning slit generation section 260, and the image acquisition section (sampling section) 270 may be implemented by hardware such as a processor (e.g., CPU) or an ASIC (e.g., gate array), a program, or the like.

The presentation section 300 presents the panoramic image or the like acquired from the I/F section 240 of the image processing system 200 to the user. The presentation section 300 may include a sound output section and/or a vibration section in addition to the display section.

Figure 18:
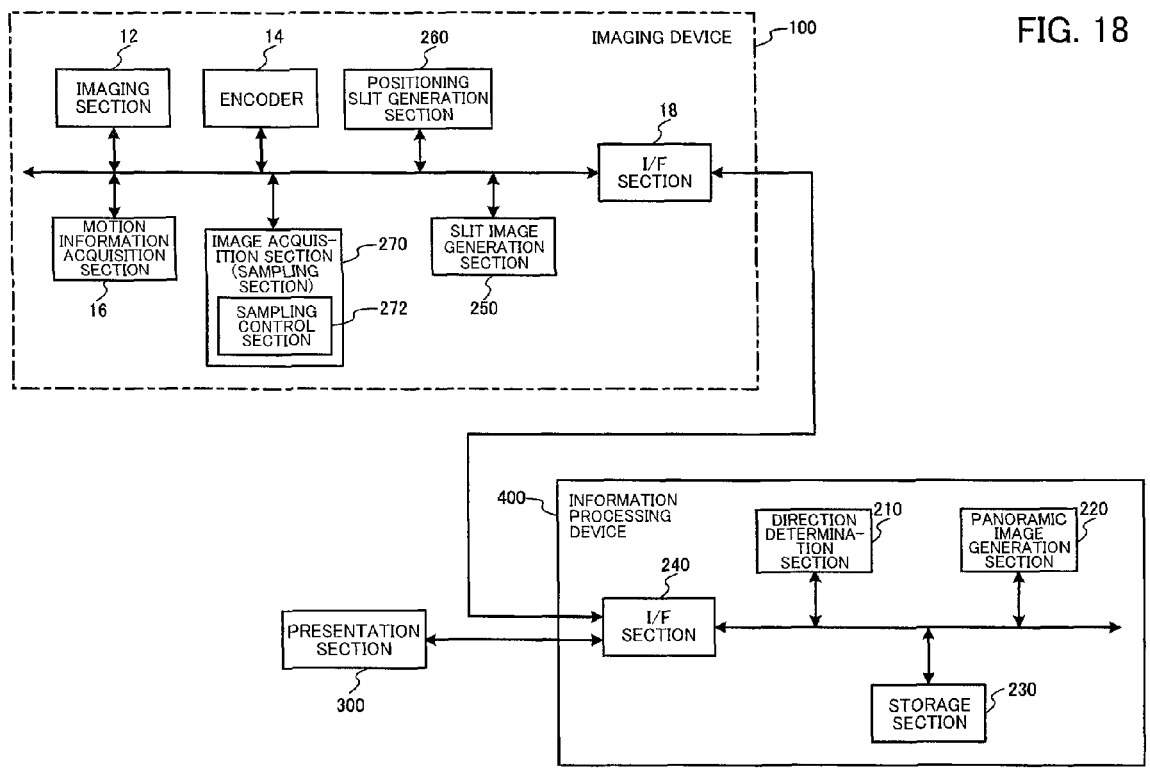
FIG. 18 illustrates another system configuration example according to one embodiment of the invention.

When the imaging device 100 is a smart camera or the like that has an image processing function, the configuration illustrated in FIG. 18 may be employed.

As illustrated in FIG. 18, the imaging device 100 may include the imaging section 12, the encoder 14, the motion information acquisition section 16, the I/F section 18, the slit image generation section 250, the positioning slit generation section 260, and the image acquisition section (sampling section) 270. An information processing device 400 may include the direction determination section 210, the panoramic image generation section 220, the storage section 230, and the I/F section 240. Note that the imaging device 100 and the information processing device 400 are not limited to the configuration illustrated in FIG. 18. Various modifications may be made, such as omitting some of the elements illustrated in FIG. 18, or adding other elements.

The function of each section included in the imaging device 100 and the information processing device 400 is the same as described above.

According to the configuration illustrated in FIG. 18, since it suffices for the imaging device 100 to transmit only the slit images and the positioning slits to the information processing device 400, the data transfer amount can be reduced.

3. Specific Embodiment

FIG. 3A illustrates a state in which an object OB is captured while moving the imaging section. FIG. 3B illustrates an image IM1 obtained when the object OB is captured from an imaging section CAM1 before the imaging section is moved, and FIG. 3C illustrates an image IM2 obtained when the object OB is captured from an imaging section CAM2 after the imaging section has been moved.

In this case, when the image IM1 and the image IM2 are synthesized to generate a panoramic image, the areas of the object OB may not be smoothly joined even when the position of the right end of the image IM1 corresponds to the position of the left end of the image IM2. Such a situation occurs when the image IM1 and the image IM2 differ in perspective due to motion parallax. Each end of an image is normally affected by motion parallax to a large extent as compared with the center area of the image.

Figure 4A:
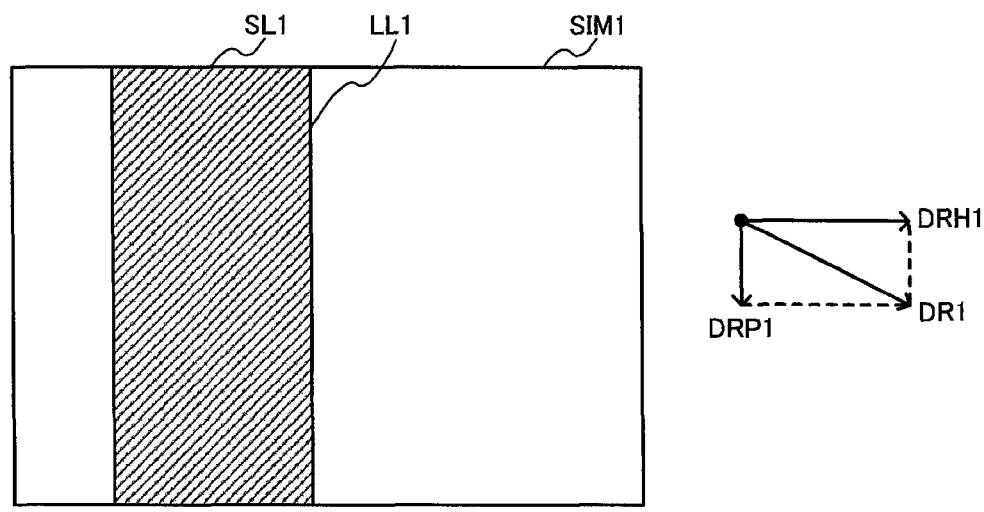
FIGS. 4A and 4B are views illustrating a slit image.
Figure 4B:
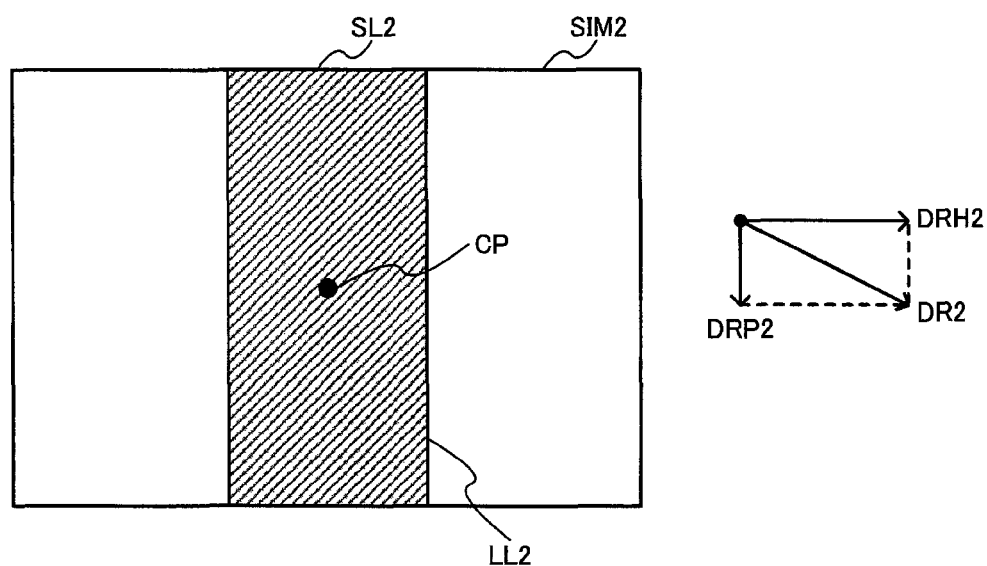

In one embodiment of the invention, a slit image (SL1) is extracted from the sampled still image (SIM1), and synthesized to generate a panoramic image (see FIG. 4A). As illustrated in FIG. 4B, it is desirable that a slit image (SL2) includes a center point (CP) of the still image (SIM2) in order to reduce the effects of motion parallax. In FIGS. 4A and 4B, the slit image is generated to have a long side along the vertical direction of the still image. Note that the slit image may be generated to have a long side along the horizontal direction of the still image.

Figure 5:
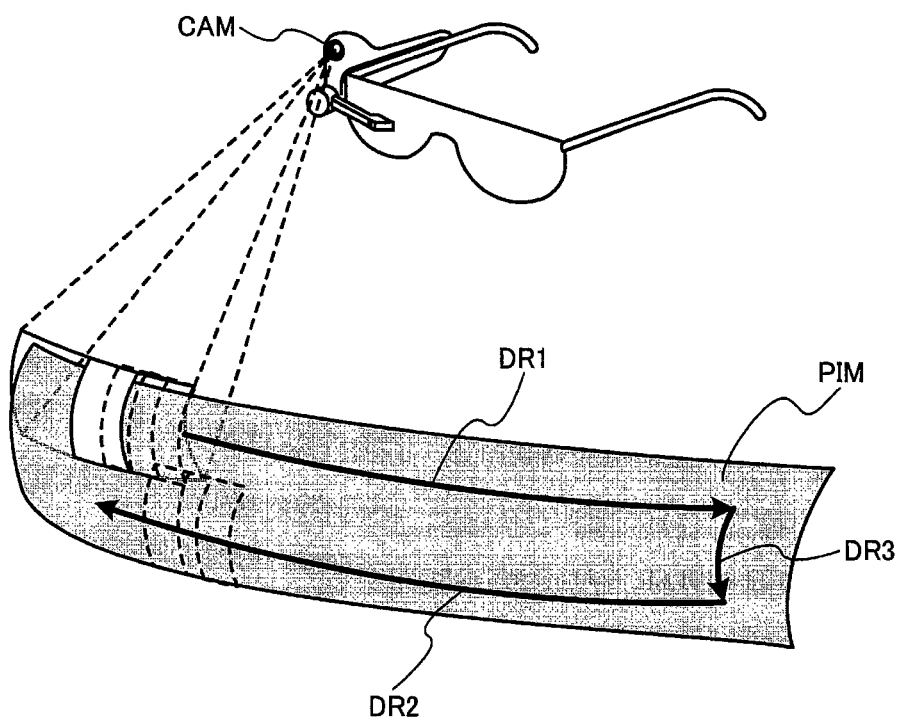
FIG. 5 is a view illustrating a technique that generates a panoramic image while moving an imaging section in a plurality of directions.

In one embodiment of the invention, the object is captured while moving the imaging section in a plurality of directions in order to generate a panoramic image having a wide angle of view in a plurality of directions. If the capture direction is completely randomly selected, it may be difficult to implement positioning, and a smooth panoramic image may not be obtained. In order to deal with this problem, the object is captured while moving the imaging section CAM along a zigzag path (see FIG. 5), and a two-dimensional panoramic image PIM is generated from the captured movie. In FIG. 5, the object is captured while moving the imaging section CAM in a first camera moving direction DR1 (described later), moving the imaging section CAM in a third camera moving direction DR3 (described later), and then moving the imaging section CAM in a second camera moving direction DR2 (described later). After moving the imaging section CAM in the second camera moving direction DR2, the object may be captured while moving the imaging section CAM in another camera moving direction.

Note that the process that extracts (samples) the still images used for synthesis of the panoramic image, the process that extracts the slit images, and the process that generates the panoramic image may be performed by the imaging device, or may be performed by an image processing system (e.g., computer) that is connected to the imaging device through a communication section via a cable or wireless network.

In one embodiment of the invention, the object is captured within approximately the field-of-view range using a head mounted-type imaging section CAM illustrated in FIG. 5.

A movie that reflects the motion of the user's head when the user looks around a scene can be easily captured by utilizing the head mounted-type imaging section CAM, and a realistic panoramic image can be generated.

Figure 6:
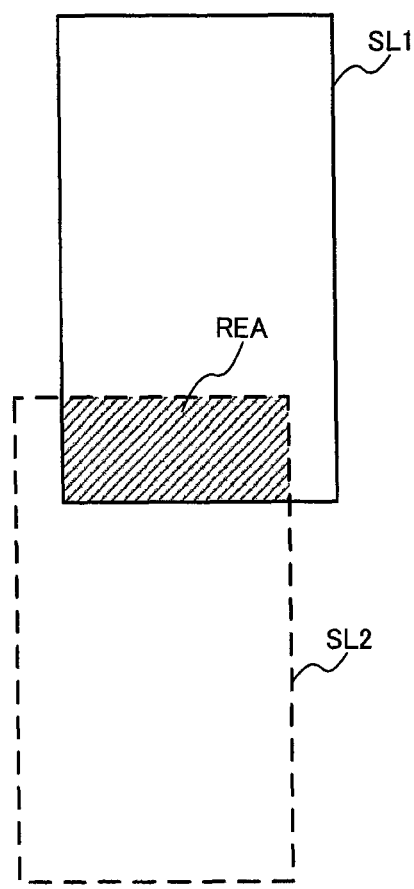
FIG. 6 is a view illustrating an overlapping area.

When generating a panoramic image using the slit images, it is necessary to perform a process that specifies the overlapping area of the slit images in the short side direction when synthesizing the slit image acquired based on the movie when moving the imaging section in the first camera moving direction in FIG. 5 and the slit image acquired based on the movie when moving the imaging section in the second camera moving direction in FIG. 5. FIG. 6 illustrates a state in which an overlapping area REA of the slit image SL1 and the slit image SL2 in the short side direction is specified.

An area that includes an identical range of the object is normally determined to be the overlapping area REA of the slit image SL1 and the slit image SL2 by comparing the slit image SL1 and the slit image SL2 (see FIG. 6). However, since the short side of the slit image is much shorter than the long side of the slit image, the overlapping area REA may be very small, and it may be difficult to specify the overlapping area when the position of the slit image SL1 and the position of the slit image SL2 are shifted in the horizontal direction (see FIG. 6). In such a case, since one slit image has an overlapping area with two (a plurality of) slit images, it is necessary to compare the slit image with two slit images when determining the overlapping area of the slit image.

The above problem may be solved by synthesizing the slit images in the first camera moving direction so that the short side of one slit image and the short side of another slit image are joined to have a sufficient length, and then synthesizing the slit images in the second camera moving direction. Specifically, the upper half (i.e., a part corresponding to the first camera moving direction DR1) of the panoramic image PIM is synthesized, and the lower half (i.e., a part corresponding to the second camera moving direction DR2) of the panoramic image PIM is then synthesized (see FIG. 5). In this case, since a problem in which one slit image has an overlapping area with a plurality of slit images does not occur, differing from the example illustrated in FIG. 6, the overlapping area can be relatively easily specified.

According to the above method, however, the slit images cannot be synthesized in the second camera moving direction when the slit images have not been completely synthesized in the first camera moving direction. For example, the upper half and the lower half of the panoramic image PIM cannot be synthesized in parallel (see FIG. 5). Therefore, the process that synthesizes the slit images in the first camera moving direction may become a bottleneck, and hinder the overall process.

Figure 7A:
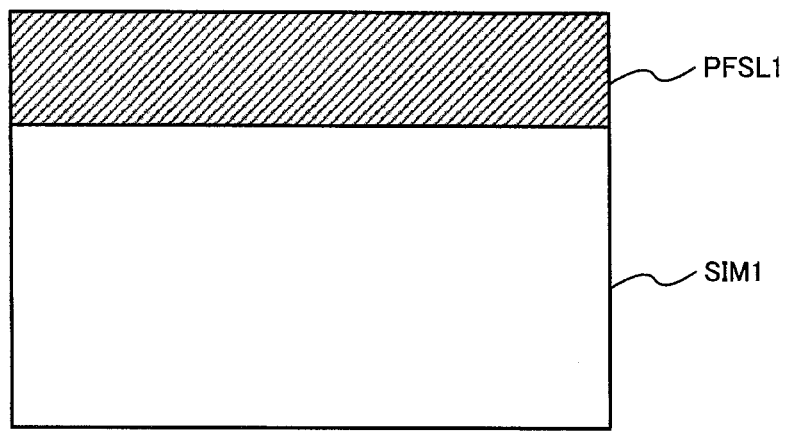
FIGS. 7A to 7C are views illustrating a positioning slit.
Figure 7B:
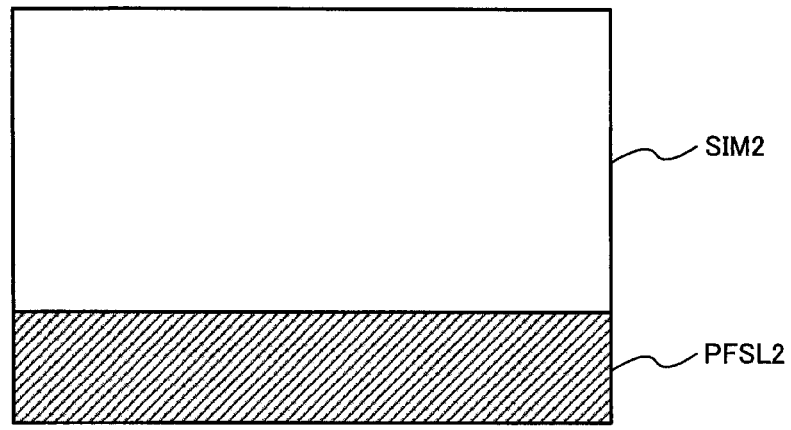
Figure 7C:
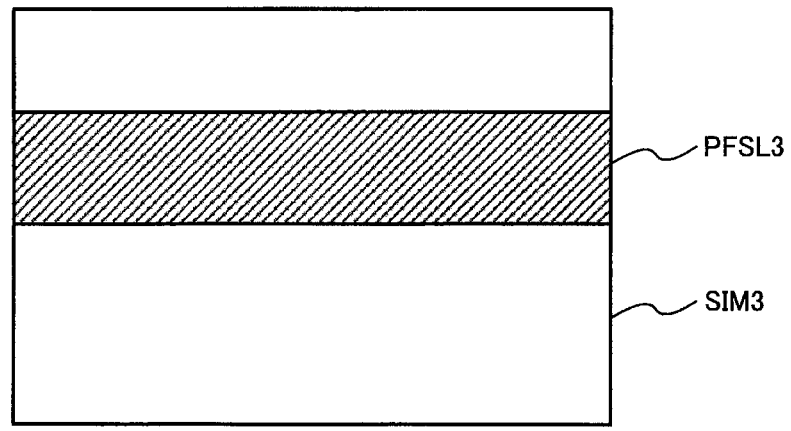

In one embodiment of the invention, the slit images are synthesized using positioning slits PFSL1 to PFSL3 illustrated in FIGS. 7A to 7C. The positioning slits PFSL1 to PFSL3 are respectively extracted from the still images SIM1 to SIM3 so that the positioning slits PFSL1 to PFSL3 are orthogonal to the slit images. The positioning slit may be extracted at an arbitrary extraction position. For example, the positioning slit may be extracted at the extraction positions illustrated in FIGS. 7A to 7C. The positioning slit may be generated each time the slit image is generated, or may be generated when a given number of slit images have been generated (i.e., the slit images have been generated a given number of times). The following description is given taking an example in which the positioning slit is generated when a given number of slit images have been generated.

Figure 8:
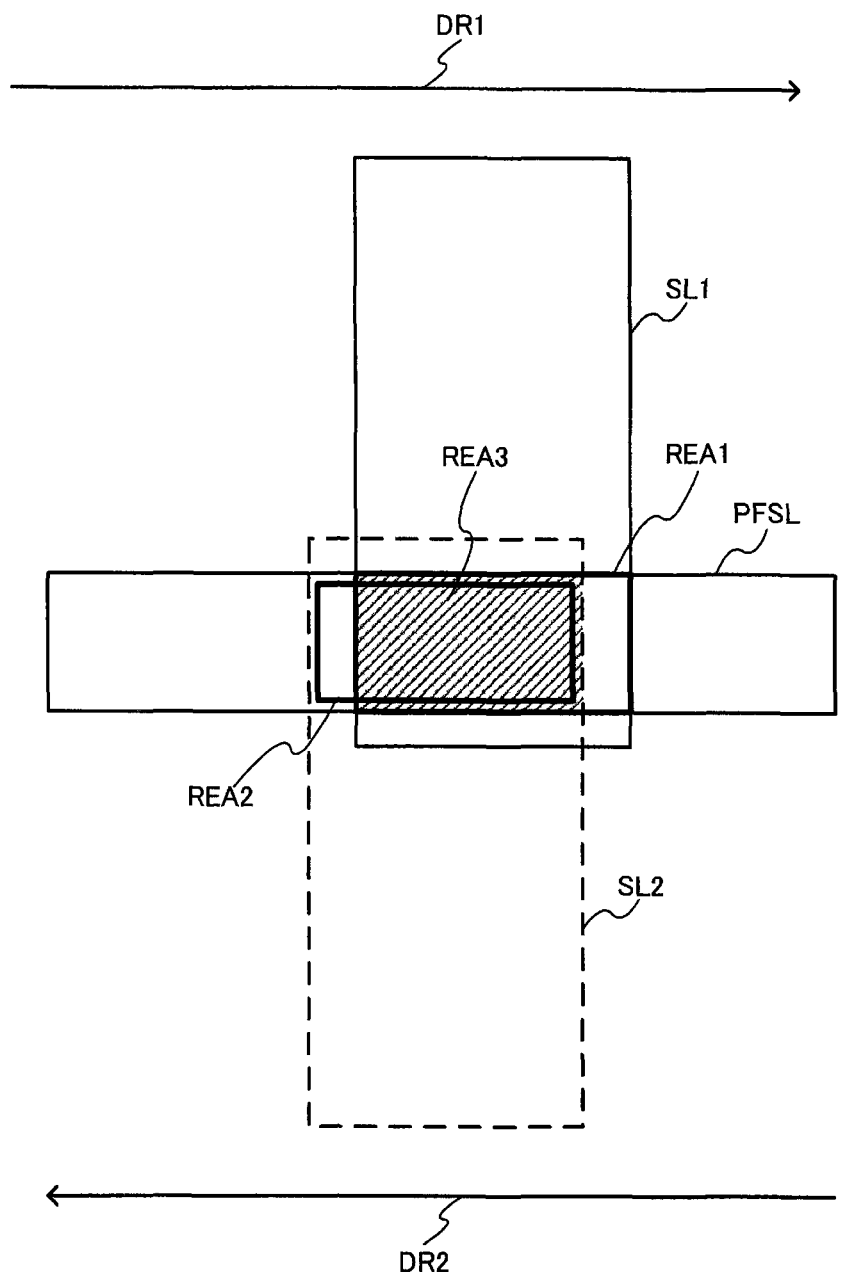
FIG. 8 is a view illustrating a method that synthesizes a slit image using a positioning slit.

In one embodiment of the invention, the slit images are not compared directly to determine the overlapping area. As illustrated in FIG. 8, the overlapping area of the slit image SL1 and the positioning slit PFSL is calculated, and the overlapping area of the slit image SL2 and the positioning slit PFSL is then calculated. The overlapping area (REA3) of the slit images SL1 and SL2 can thus be calculated indirectly.

The example illustrated in FIG. 8 is described in detail below. The slit images SL1 and SL2, and the positioning slit PFSL illustrated in FIG. 8 are generated based different still images. Specifically, the positioning slit PFSL is acquired based on the still image captured when the imaging section is moved in the first camera moving direction DR1. The slit image SL1 is generated based on another still image captured when the imaging section is further moved in the first camera moving direction DR1.

The image included in the slit image SL1 is compared with the image included in the positioning slit PFSL (i.e., image comparison process) to determine the overlapping area REA1. For example, the slit image SL1 is assigned at the left end of the positioning slit (initial position). The image included in the slit image SL1 is compared with the image included in the positioning slit PFSL while moving the slit image SL1 from the initial position in the rightward direction. When it has been determined that the image included in the slit image SL1 coincides with the image included in the positioning slit PFSL, the coincident area is determined to be the overlapping area of the slit image SL1 and the positioning slit PFSL. When the image included in the slit image SL1 does not coincide with the image included in the positioning slit PFSL even when the slit image SL1 has been moved to the right end of the positioning slit PFSL, the slit image SL1 is moved in the downward direction, and the image included in the slit image SL1 is compared with the image included in the positioning slit PFSL while moving the slit image SL1 in the leftward direction. The above process is repeated while moving the slit image SL1 in the downward direction and the horizontal direction. The slit images cannot be synthesized when an overlapping area cannot be specified by moving the slit image SL1 in the downward direction and the horizontal direction. Note that it is unnecessary to perform the above process when the slit image SL1 and the positioning slit PFSL have been extracted from an identical still image since the overlapping area REA1 is known.

The slit image SL2 is generated based on the still image captured when the imaging section is moved in the second camera moving direction DR2. The image included in the slit image SL2 is compared with the image included in the positioning slit PFSL in the same manner as described above instead of comparing the image included in the slit image SL2 with the image included in the slit image SL1 to determine the overlapping area REA2. In FIG. 8, the overlapping area REA2 is drawn for convenience of illustration so that the right edge and the left edge of the overlapping area REA2 do not coincide with the right edge and the left edge of the slit image SL2. Note that the right edge and the left edge of the overlapping area REA2 coincide with the right edge and the left edge of the slit image SL2 in the actual situation.

The overlapping area of the overlapping areas REA1 and REA2 is then calculated to determine the overlapping area REA3 of the slit images SL1 and SL2.

The above method has an advantage in that the overlapping area can be easily specified (i.e., does not become small) even when the slit images SL1 and SL2 are shifted from each other in the horizontal direction since the overlapping area of the slit image and the positioning slit is calculated instead of directly calculating the overlapping area of the slit images SL1 and SL2.

Moreover, since the slit images can be synthesized in the second camera moving direction even when the slit images have not been completely synthesized in the first camera moving direction, it is possible to prevent a situation in which the process that synthesizes the slit images in the first camera moving direction becomes a bottleneck, and the panoramic image generation process can be performed at high speed, for example.

It is desirable to perform the synthesis process in two steps in order to implement more accurate image synthesis. In the first step, the overlapping area of the slit images is calculated using the positioning slit to obtain a temporary slit image synthesis position (first synthesis process). In the second step, the accuracy of the slit image synthesis position is improved to obtain the final slit image synthesis position (second synthesis process). Note that the second synthesis process includes a matching process that utilizes a feature point, or a three-dimensional reconstruction process that utilizes bundle adjustment or the like.

For example, when the third camera moving direction DR3 (see FIG. 5) has not been determined to be the upward direction or the downward direction, but it has been determined that the overlapping area is specified using the positioning slit acquired when the imaging section is moved in the first camera moving direction DR1, it may be impossible to determine the overlapping area as described above using the positioning slit depending on the extraction position of the positioning slit.

Figure 9A:
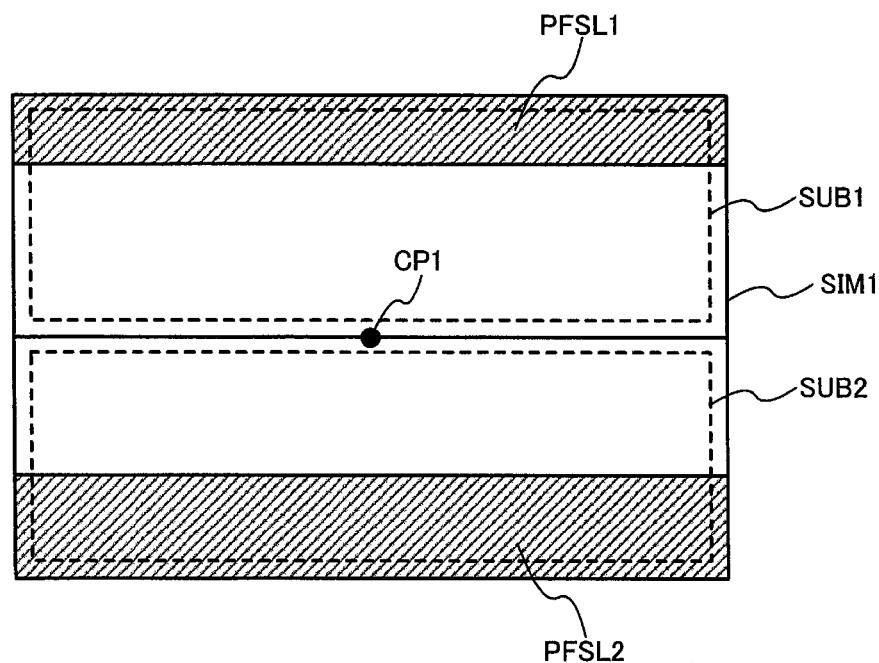
FIGS. 9A and 9B are views illustrating a method that extracts a plurality of positioning slits from a single still image.
Figure 9B:
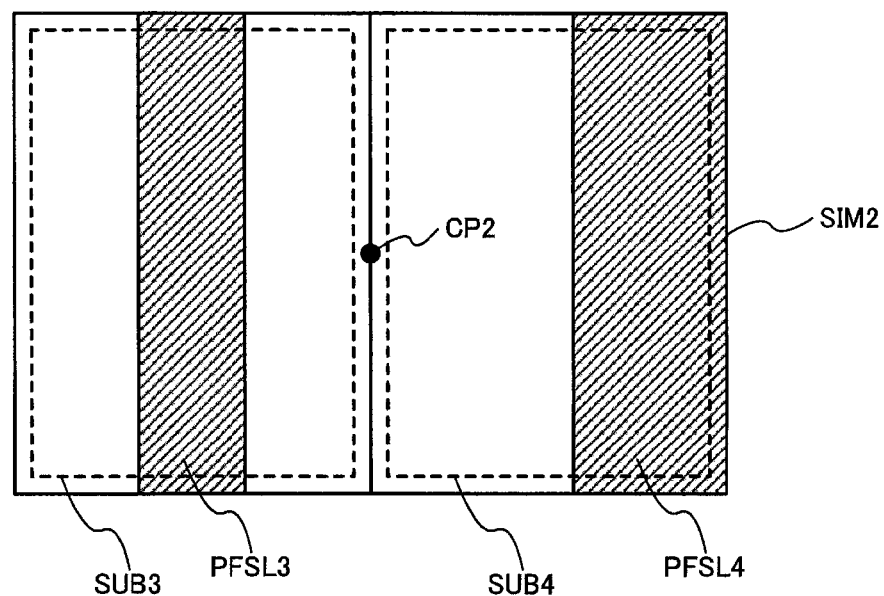

In order to deal with such a situation, a plurality of positioning slits may be extracted from a single still image, as illustrated in FIGS. 9A and 9B. In FIG. 9A, a first positioning slit PFSL1 is extracted from a first area SUB1 (described later) of the still image SIM1, and a second positioning slit PFSL2 is extracted from a second area SUB2 (described later) of the still image SIM1. In FIG. 9B, a first positioning slit PFSL3 is extracted from a first area SUB3 (described later) of the still image SIM2, and a second positioning slit PFSL4 is extracted from a second area SUB4 (described later) of the still image SIM2.

The above configuration makes it possible to selectively use the first positioning slit or the second positioning slit when specifying the overlapping area of the slit images, for example. Specifically, it is possible to select the positioning slit corresponding to the camera moving direction, and determine the overlapping area even when the imaging section is moved in an arbitrary direction, for example.

For example, when using the positioning slit acquired when the imaging section is moved in the first camera moving direction in the example illustrated in FIG. 5, the first positioning slit PFSL1 illustrated in FIG. 9A can be used when the third camera moving direction is the upward direction, and the second positioning slit PFSL2 illustrated in FIG. 9A can be used when the third camera moving direction is the downward direction.

Moreover, when using the positioning slit acquired when the imaging section is moved in the first camera moving direction, the positional relationship between the positioning slit and the slit image acquired when the imaging section is moved in the first camera moving direction can be determined before moving the imaging section in the second camera moving direction, and the process that specifies the overlapping area can be started immediately after the imaging section has been moved in the second camera moving direction, and the slit image has been acquired. This makes it possible to reduce the processing time, for example.

Figure 10:
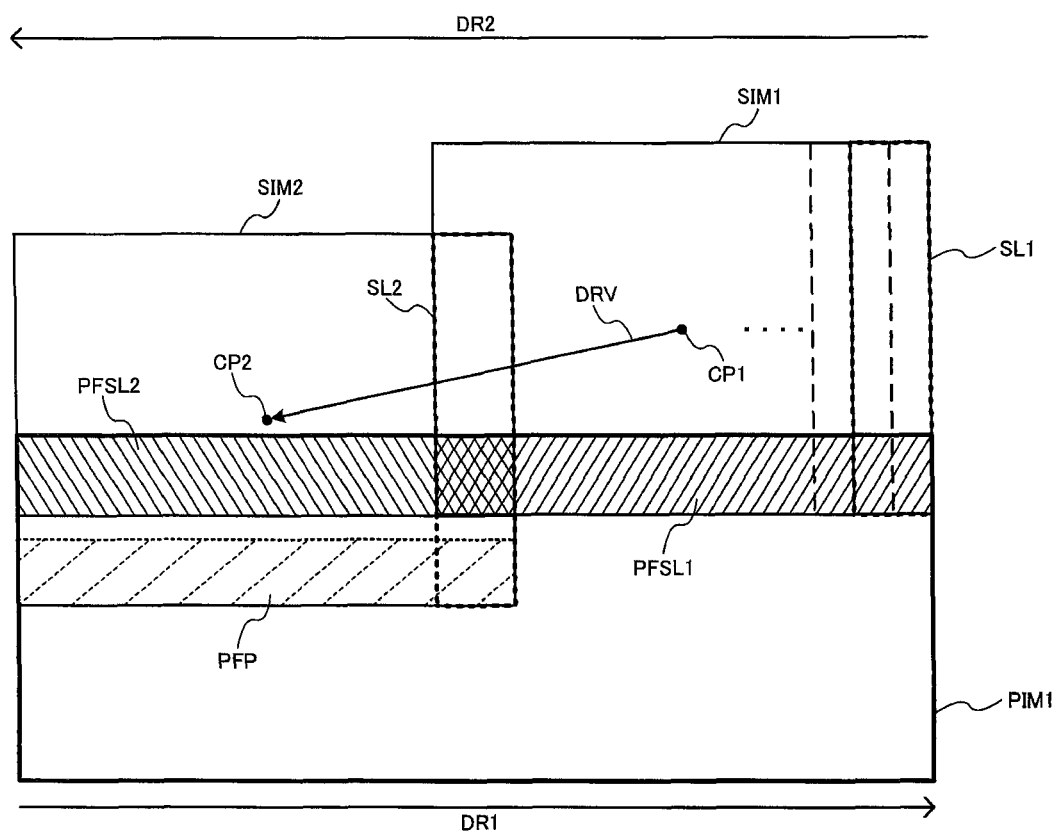
FIG. 10 is a view illustrating a method that changes a positioning slit extraction position.

FIG. 10 illustrates an example in which an image PIM1 is generated when the imaging section is moved in the first camera moving direction DR1, and the imaging section is then moved in the second camera moving direction DR2. The positioning slit is generated based on the still image captured when the imaging section is moved in the second camera moving direction DR2. The overlapping area of the image PIM1 and the positioning slit is searched in the downward direction.

In this case, when the imaging section has been moved as indicated by a motion vector DRV, and the position of the imaging section has changed from a position CP1 to a position CP2, the overlapping area search range changes to a large extent in the vertical direction within the image PIM1 when the positioning slit is extracted from a position PFP, and it takes time to search the overlapping area in proportion to the magnitude of the vertical component of the motion vector DRV.

In order to deal with the above situation, the extraction position of the positioning slit is dynamically changed based on the motion information acquired by the motion information acquisition section. In FIG. 10, the extraction position of the positioning slit within a still image SIM2 is changed to extract a positioning slit PFSL2 that has continuity with a positioning slit PFSL1. This makes it possible to prevent a situation in which the overlapping area search range changes to a large extent in the vertical direction within the image PIM1. Therefore, it is possible to efficiently perform the overlapping area search process that searches the overlapping area of the image PIM1 and the positioning slit PFSL2.

The positioning slit is extracted from both the still image captured when the imaging section is moved in the first camera moving direction and the still image captured when the imaging section is moved in the second camera moving direction. The positioning slit used to specify the overlapping area may be determined as described below.

Figure 11A:
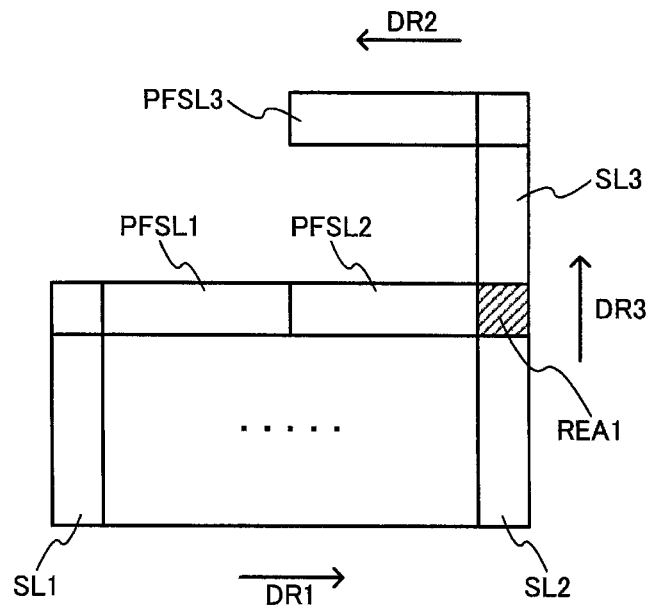
FIGS. 11A and 11B illustrate examples of a method that selects a positioning slit.

FIG. 11A illustrates an example in which the positioning slit is generated from the upper part of the still image (i.e., a part of the still image assigned in the third camera moving direction). In the example illustrated in FIG. 11A, positioning slits PFSL1 and PFSL2 are generated based on the still images sampled when the camera moving direction is the first camera moving direction DR1, and a positioning slit PFSL3 is generated based on the still image sampled when the camera moving direction is the second camera moving direction DR2.

In this case, it is necessary to select the positioning slit used when synthesizing the upper part (e.g., slit image SL3) and the lower part (e.g., slit image SL2) of the panoramic image. Since the third camera moving direction DR3 is the upward direction in the example illustrated in FIG. 11A, the positioning slits PFSL1 and PFSL2 are assigned at the boundary between the upper half and the lower half of the panoramic image.

Therefore, the slit images are synthesized using the positioning slits PFSL1 and PFSL2 generated based on the still images sampled when the camera moving direction is the first camera moving direction DR1.

Figure 11B:
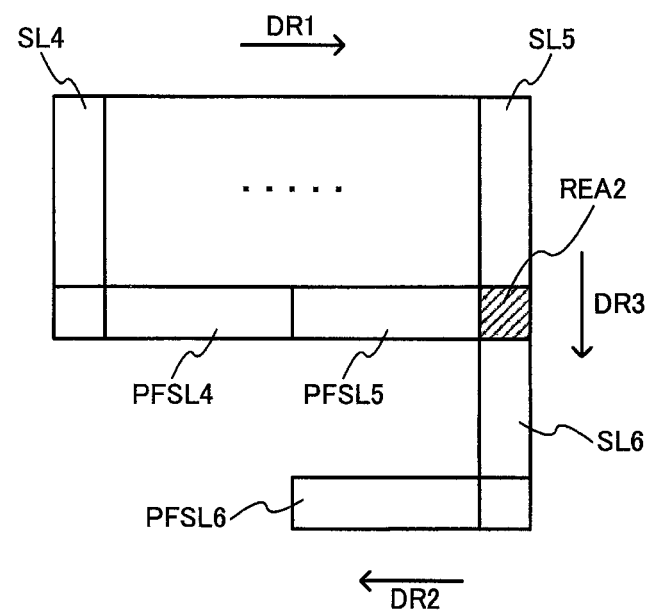

FIG. 11B illustrates an example in which the positioning slit is generated from the lower part of the still image (i.e., a part of the still image assigned in the third camera moving direction). In the example illustrated in FIG. 11B, positioning slits PFSL4 and PFSL5 are generated based on the still images sampled when the camera moving direction is the first camera moving direction DR1, and a positioning slit PFSL6 is generated based on the still image sampled when the camera moving direction is the second camera moving direction DR2.

In this case, it is necessary to select the positioning slit used when synthesizing the upper part (e.g., slit image SL5) and the lower part (e.g., slit image SL6) of the panoramic image. Since the third camera moving direction DR3 is the downward direction in the example illustrated in FIG. 11B, the positioning slits PFSL4 and PFSL5 are assigned at the boundary between the upper half and the lower half of the panoramic image.

Therefore, the slit images are synthesized using the positioning slits PFSL4 and PFSL5 generated based on the still images sampled when the camera moving direction is the first camera moving direction DR1 in the same manner as in the example illustrated in FIG. 11A.

Figure 12A:
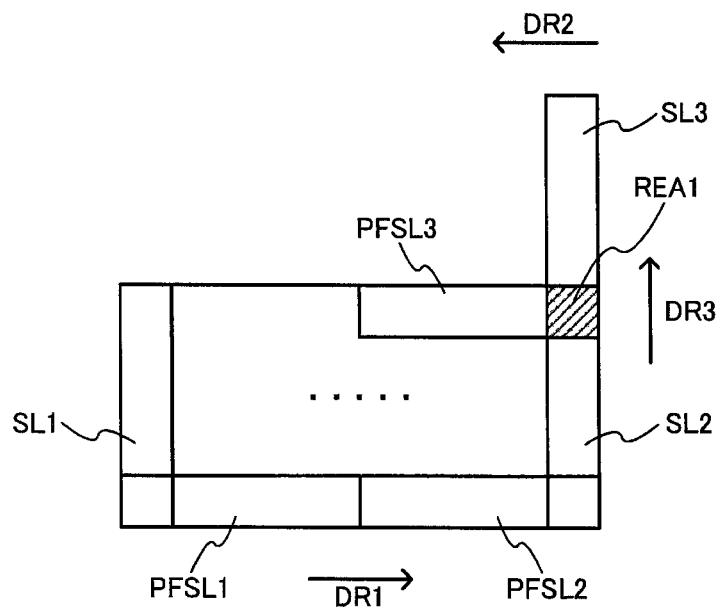
FIGS. 12A and 12B illustrate further examples of a method that selects a positioning slit.

FIG. 12A illustrates an example in which the positioning slit is generated from the lower part of the still image (i.e., a part of the still image assigned in the direction opposite to the third camera moving direction). In this case, positioning slits PFSL1 and PFSL2 are generated based on the still images sampled when the camera moving direction is the first camera moving direction DR1, and a positioning slit PFSL3 is generated based on the still image sampled when the camera moving direction is the second camera moving direction DR2.

In this case, it is necessary to select the positioning slit used when synthesizing the upper part (e.g., slit image SL3) and the lower part (e.g., slit image SL2) of the panoramic image. Since the third camera moving direction DR3 is the upward direction in the example illustrated in FIG. 12A, the positioning slit PFSL3 is assigned at the boundary between the upper half and the lower half of the panoramic image.

Therefore, in FIG. 12A, the slit images are synthesized using the positioning slit PFSL3 generated based on the still image sampled when the camera moving direction is the second camera moving direction DR2.

Figure 12B:
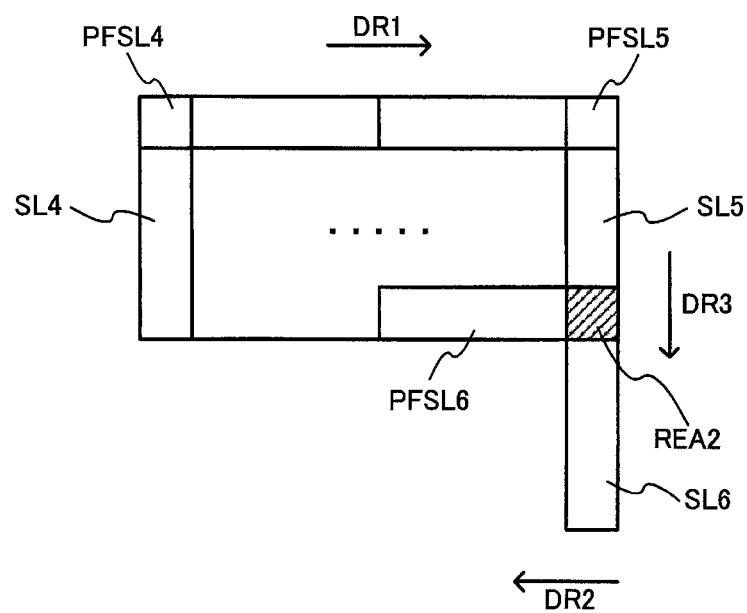

FIG. 12B illustrates an example in which the positioning slit is generated from the upper part of the still image (i.e., a part of the still image assigned in the direction opposite to the third camera moving direction). In the example illustrated in FIG. 12B, positioning slits PFSL4 and PFSL5 are generated based on the still images sampled when the camera moving direction is the first camera moving direction DR1, and a positioning slit PFSL6 is generated based on the still image sampled when the camera moving direction is the second camera moving direction DR2.

In this case, it is necessary to select the positioning slit used when synthesizing the upper part (e.g., slit image SL5) and the lower part (e.g., slit image SL6) of the panoramic image. Since the third camera moving direction DR3 is the downward direction in the example illustrated in FIG. 12B, the positioning slit PFSL6 is assigned at the boundary between the upper half and the lower half of the panoramic image.

Therefore, the slit images are synthesized using the positioning slit PFSL6 generated based on the still image sampled when the camera moving direction is the second camera moving direction DR2.

As described above with reference to FIG. 8, it is necessary to perform the image comparison process while moving the slit image along the positioning slit when specifying the overlapping area of the slit images using the positioning slit.

Figure 13A:
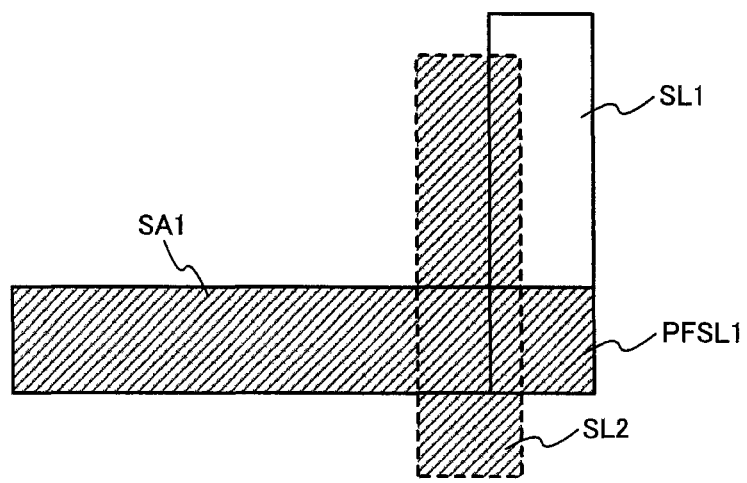
FIGS. 13A to 13C are views illustrating a method that limits an overlapping area search range.

A problem that may occur when using the above method is described below with reference to FIG. 13A. In FIG. 13A, a positioning slit PFSL1 and a slit image SL1 are generated from a single still image. A slit image SL2 is generated from a different still image, and the overlapping area of the slit image SL2 and the positioning slit PFSL1 is specified. In this case, the slit image SL2 is assigned at the right end of the positioning slit, and the image comparison process is performed while moving the slit image SL2 in the leftward direction as described above with reference to FIG. 8, for example. When it has been determined that the image included in the slit image SL2 coincides with the image included in the positioning slit PFSL1, the coincident area is determined to be the overlapping area of the slit image SL2 and the positioning slit PFSL1. When the image included in the slit image SL2 does not coincide with the image included in the positioning slit PFSL1, the image comparison process is performed while further moving the slit image SL2 in the leftward direction. When the slit image SL2 has reached the left end of the positioning slit, the slit image SL2 is shifted in the downward direction, and the image comparison process is performed while moving the slit image SL2 in the horizontal direction. According to the above method, however, it is necessary to search the overlapping area over the entire combinatorial area SA1 (shaded area) of the slit image SL2 and the positioning slit PFSL1 (see FIG. 13A). Therefore, the load of the process that specifies the overlapping area increases. The process that specifies the overlapping area can be performed at high speed if the overlapping area search range can be limited.

Figure 13B:
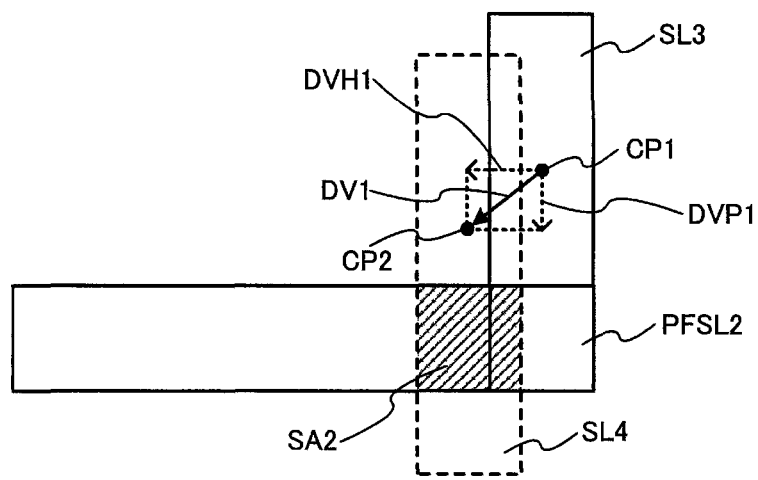

In order to deal with the above problem, when the imaging section is moved as indicated by a motion vector DV1 (indicated by the motion information) (see FIG. 13B), the position of the overlapping area of the slit image SL4 is estimated based on the vertical component DVP1 and the horizontal component DVH1 of the motion vector DV1, and the search range is limited to a search range SA2 (shaded area). In other words, the position of the slit image SL4 after the imaging section has been moved is estimated based on the motion vector DV1 and the position of the slit image SL3 before the imaging section is moved. Note that the search range SA2 may be enlarged by given pixels in the upward direction, the downward direction, the rightward direction, and the leftward direction taking account of a motion vector calculation error, for example.

However, estimation in the direction perpendicular to the camera moving direction is not necessarily advantageous taking account of camera shake, the motion of the head, and the like. It may be impossible to specify the overlapping area when camera shake or the like has temporarily occurred to a large extent.

Figure 13C:
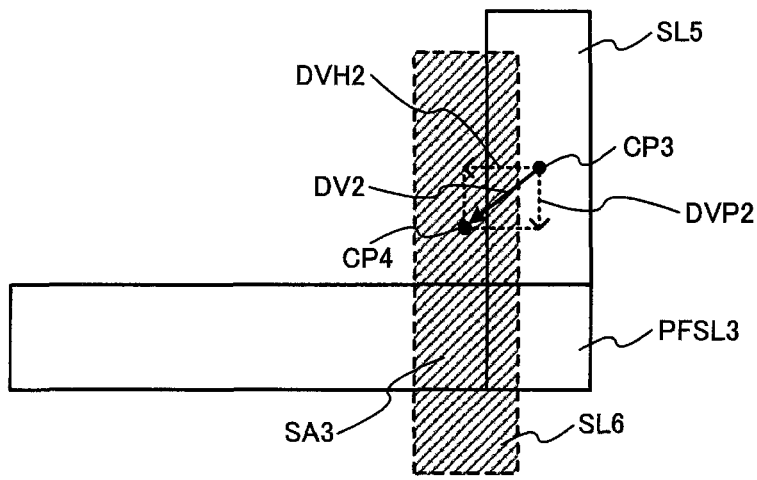

In order to deal with such a problem, the position of the slit image SL6 (see FIG. 13C) after the imaging section has been moved may be estimated using only the horizontal component DVH2 of the motion vector DV2, and the entire slit image may be set to be the search range (SA3) (shaded area) in the vertical direction. In this case, the image comparison process is performed on the slit image SL6 and the positioning slit PFSL3 while moving the slit image SL6 in the vertical direction without moving the slit image SL6 in the horizontal direction. Note that the search range SA3 may be enlarged by given pixels in the upward direction, the downward direction, the rightward direction, and the leftward direction in the same manner as the search range SA2 taking account of a motion vector calculation error, for example.

The still image need not be sampled when it is determined that the overlapping area cannot be specified from the motion information.

A method that controls the sampling process so that the overlapping area can be specified is described below.

The overlapping area of the slit images becomes narrow if the image acquisition rate (sampling rate) is constant even when the camera moving speed (shooting speed) has increased. In such a case, the slit images may not have an overlapping area. This makes it impossible to generate the panoramic image. On the other hand, unnecessary frames are acquired, and the amount of image information unnecessarily increases if the sampling rate is constant even when the camera moving speed has decreased. In this case, it may be difficult to synthesize the slit images. Moreover, since the number of slit images to be synthesized increases when unnecessary frames are acquired, the processing load increases.

In one embodiment of the invention, the sampling rate is increased when the camera moving speed has increased.

Figure 14:
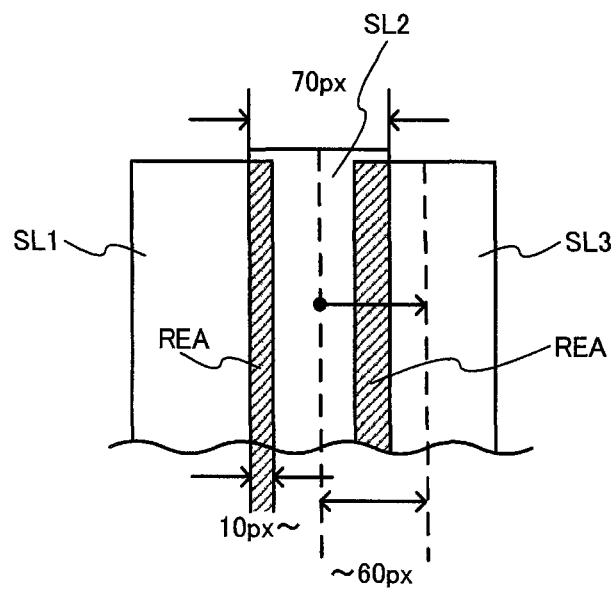
FIG. 14 is a view illustrating a method that increases an image acquisition rate when a camera moving speed has increased.

As illustrated in FIG. 14, when the width of the slit image is 70 px (pixels), and the minimum width of the overlapping area between the adjacent slits is 10 px, the center-to-center distance between the adjacent slit images must be 60 px or less.

For example, the imaging section captures an image at 30 fps (frames per second), and the camera moving speed acquired from the motion information is 10 px/frame. Note that the unit "px/frame" refers to the number of pixels by which the pixels within an identical range of the object move per frame. For example, "10 px/frame" means that the pixels within an identical range of the object move by 10 px per frame.

In this case, a minimum overlapping area can be obtained by setting the sampling rate to 5 fps (=30 fps×(10 px/60 px)) or more. When the camera moving speed has increased to 15 px/frame, 30 fps×(15 px/60 px)=7.5 fps. Therefore, the slit images can be acquired while maintaining the width of the overlapping area by setting the sampling rate to 8 fps or more.

This makes it possible to obtain the slit images having an overlapping area necessary and sufficient for synthesizing the panoramic image. When the shutter speed (frame rate) is increased and decreased corresponding to the camera moving speed, the object may be blurred when the frame rate is insufficient. However, when the sampling rate is increased and decreased while keeping the frame rate constant, the amount of data can be reduced (i.e., unnecessary frames can be eliminated) while preventing a situation in which the object is blurred.

The width of the slit image may be increased in order to provide the overlapping area when the camera moving speed has increased.

Figure 15:
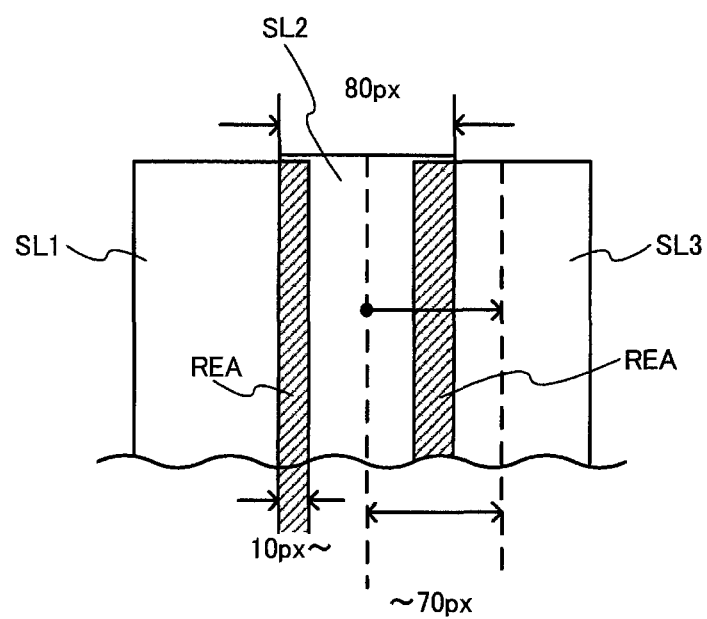
FIG. 15 is a view illustrating a method that increases a slit image width when a camera moving speed has increased.

FIG. 15 illustrates an example in which the width of the slit image is 70 px, the minimum width of the overlapping area of the adjacent slits is 10 px, and the sampling rate can be increased only up to 5 fps (or the maximum capacity of the imaging section is 5 fps). When the sampling rate is set to 5 fps, it is possible to deal with a camera moving speed of up to 60 px/frame since the maximum center-to-center distance is 60 px (=70 px−10 px). However, when the camera moving speed has increased to 70 px/frame, for example, it is impossible to provide the overlapping area of the slits since the frame rate cannot be further increased. In this case, the width of the slit image may be set to 80 px (=70 px+10 px) or more in order to secure 10 px or more on each end of the slit image.

This makes it possible to provide an overlapping area even when the sampling rate cannot be increased due to limitations to the hardware or the network.

4. Method

According to the above embodiments, the image processing system includes an image acquisition section 270 that consecutively acquires still images, a direction determination section 210 that determines a camera moving direction, the camera moving direction being a moving direction of an imaging section 12 during capture, a slit image generation section 250 that generates slit images based on the consecutively acquired still images; and a panoramic image generation section 220 that performs a synthesis process of the slit images to generate a panoramic image. The direction determination section 210 determines whether the camera moving direction is a first camera moving direction or a second camera moving direction that differs from the first camera moving direction when the imaging section 12 is moved during capture. The panoramic image generation section 220 determines a synthesis position of a slit image among the slit images based on the camera moving direction when the consecutively acquired still images were captured, and performs the synthesis process of the slit image to generate the panoramic image.

According to the above configuration, when the imaging section is moved in a plurality of camera moving directions during capture, still images used to generate the slit images can be consecutively acquired, and the current camera moving direction can be determined. The slit images can be generated based on the consecutively acquired still images.

The expression "consecutively acquires still images" used herein when the imaging section captures a still image means acquiring still images consecutively captured while consecutively moving the imaging section. The expression "consecutively acquires still images" used herein when the imaging section captures a movie means that the image acquisition section 270 samples and acquires still images from a movie captured while consecutively moving the imaging section, or means acquiring still images sampled by another functional section (e.g., imaging section) from a movie captured while consecutively moving the imaging section.

The term "slit image" used herein refers to part or the entirety of a still image among the consecutively acquired still images that has a given area. The term "slit image" used herein refers to an image used to generate the panoramic image. For example, the slit image refers to the area SL1 illustrated in FIG. 4A or the area SL2 illustrated in FIG. 4B.

The term "camera moving direction" used herein refers to the direction of a vector that connects two arbitrary different points along a path that is drawn when moving the imaging section. For example, the camera moving direction refers to the direction DR1, DR2, or DR3 illustrated in FIG. 5. The camera moving direction may be set in advance. When one of the horizontal component and the vertical component of the motion vector indicated by the motion information about the imaging section acquired by the motion information acquisition section (described later) is continuously larger than the other component for a given period, the direction corresponding to the component that is larger than the other component may be determined to be the camera moving direction.

An arbitrary camera moving direction is referred to as the first camera moving direction, and an arbitrary camera moving direction that differs from the first camera moving direction is referred to as the second camera moving direction. Note that the camera moving direction is not limited to the first camera moving direction and the second camera moving direction. A camera moving direction other than the first camera moving direction and the second camera moving direction may also be used.

According to the above configuration, the synthesis position of the slit image can be determined based on the camera moving direction, and the synthesis process can then be performed.

The term "synthesis process" used herein refers to a process that generates a single image so that an image acquired as a result of performing the synthesis process overlaps a newly generated slit image.

The term "synthesis position" used herein refers to the position of the slit image relative to an image acquired as a result of performing the synthesis process.

Therefore, it is possible to generate a panoramic image of which the angle of view is wider in a plurality of directions than that of a panoramic image generated by moving the imaging section in one camera moving direction. It is also possible to generate a panoramic image that covers a wide range of the imaging area of the imaging section in the vertical direction and the horizontal direction while reducing a difference in perspective due to motion parallax by utilizing the slit image as a material for generating the panoramic image.

The image processing system may further includes a positioning slit generation section 260 that generates a positioning slit based on a still image among the consecutively acquired still images. The panoramic image generation section 220 may determine the synthesis position of the slit image based on the camera moving direction when the consecutively acquired still images were captured, and the positioning slit, and may perform the synthesis process of the slit image to generate the panoramic image.

The term "positioning slit" used herein refers to part or the entirety of a still image among the consecutively acquired still images. The term "positioning slit" used herein refers to an image that partially coincides with the slit image, but does not perfectly coincide with the slit image. For example, the positioning slit refers to the area PFSL1 illustrated in FIG. 7A, the area PFSL2 illustrated in FIG. 7B, or the area PFSL3 illustrated in FIG. 7C.

According to the above configuration, since a problem does not occur even when one slit image has an overlapping area with a plurality of slit images, the overlapping area can be relatively easily specified, for example. Moreover, since the slit images can be synthesized in the second camera moving direction even when the slit images have not been completely synthesized in the first camera moving direction, it is possible to prevent a situation in which the process that synthesizes the slit images in the first camera moving direction becomes a bottleneck, and the panoramic image generation process can be performed at high speed, for example.

The positioning slit generation section 260 may generate the positioning slit so that a long side of the slit image is orthogonal to a long side of the positioning slit.

The expression "a long side of the slit image is orthogonal to a long side of the positioning slit" refers to the relationship between the slit image SL1 (or SL2) and the positioning slit PFSL illustrated in FIG. 8, for example. Note that the long side of the slit image may be approximately orthogonal to the long side of the positioning slit.

The positioning slit is generated by extracting (e.g., copying) a given area of the still image as the positioning slit. The positioning slit may be generated by generating a new image of the positioning slit based on the still image.

According to the above configuration, the overlapping area can be specified so that the short side of the slit image coincides with the long side of the positioning slit, for example. Therefore, since the process that specifies the overlapping area is less frequently performed at the boundary between the positioning slits, it is possible to suppress a situation in which the boundary between the positioning slits is discontinuous, and the overlapping area of the slit images cannot be specified, for example.

The positioning slit generation section 260 may set a first area and a second area based on a straight line that passes through a center of the still image, may generate a first positioning slit from the first area, and may generate a second positioning slit from the second area.

The first area refers to one of the areas of the still image divided by the straight line that passes through the center of the still image. The second area refers to the other area of the still image. In FIG. 9A, the still image SIM1 is divided by the straight line that passes through the center CP1 of the still image SIM1. The area SUB1 corresponds to the first area, and the area SUB2 corresponds to the second area. In FIG. 9B, the area SUB3 corresponds to the first area, and the area SUB4 corresponds to the second area.

The above configuration makes it possible to selectively use the first positioning slit or the second positioning slit when specifying the overlapping area of the slit images, for example. Specifically, it is possible to select the positioning slit corresponding to the camera moving direction, and determine the overlapping area even when the imaging section is moved in an arbitrary direction, for example.

The positioning slit generation section 260 may change an extraction position of the positioning slit within the still image based on motion information about the imaging section 12 acquired from a motion information acquisition section 16, and may generate the positioning slit.

The term "motion information" used herein refers to sensor information or a motion vector acquired by the motion information acquisition section.

The above configuration makes it possible to extract the positioning slit from the same position as that of the previously used positioning slit when the position of the imaging section has changed to a large extent (see FIG. 10), and efficiently perform the search process that searches the overlapping area of the synthesis target image and the positioning slit, for example.

The panoramic image generation section 220 may shift the synthesis position in a direction perpendicular to the first camera moving direction when it has been determined that the camera moving direction is the second camera moving direction, and may perform the synthesis process so that part of the positioning slit overlaps part of the slit image to generate the panoramic image.

Specifically, the slit image SL3 (see FIG. 11A) captured when the imaging section is moved in the second camera moving direction DR2 is synthesized at a position shifted in the direction DR3 perpendicular to the first camera moving direction DR1 from the synthesis position of the slit image SL2 captured when the imaging section is moved in the first camera moving direction DR1. Note that the panoramic image generation section 220 may shift the synthesis position of the slit image captured when the imaging section is moved in the second camera moving direction in a direction approximately perpendicular to the first camera moving direction.

The above configuration makes it possible to generate a panoramic image that covers a wide range of the imaging area in the vertical direction and the horizontal direction when the imaging section was moved along a zigzag path, for example.

It is desirable that the overlapping area be an area of the slit image assigned on the end of the slit image (e.g., an area equal to about 20% of the entire slit image). For example, when half or more of the slit image is the overlapping area, the effects achieved by synthesizing the slit images are small since the angle of view of the synthesized image is not sufficiently larger than the angle of view of the original slit image.

Specifically, it is desirable to synthesize only an area of the slit image assigned on the end of the slit image in order to improve the effects achieved by synthesizing the slit images. Therefore, it is desirable that the positioning slit used for the synthesis process of the slit image be an image corresponding to the boundary between the slit images.

Moreover, it may be difficult to specify the overlapping area of the slit images using the positioning slit depending on the positional relationship between the slit image and the positioning slit.

As described above, it is important to appropriately use the positioning slit in order to improve the effects achieved by synthesizing the slit images.

The direction determination section 210 may determine the camera moving direction when the imaging section 12 is moved in the first camera moving direction, moved in a third camera moving direction that differs from the first camera moving direction and the second camera moving direction, and then moved in the second camera moving direction during capture. The panoramic image generation section 220 may use the positioning slit generated based on the still image acquired when the camera moving direction is the first camera moving direction for the synthesis process when the positioning slit was generated from an area of the still image assigned in the third camera moving direction relative to a center of the still image. The panoramic image generation section 220 may also use the positioning slit generated based on the still image acquired when the camera moving direction is the second camera moving direction for the synthesis process when the positioning slit was generated from an area of the still image assigned in a direction opposite to the third camera moving direction relative to the center of the still image.

The third camera moving direction refers to a direction that differs from the first camera moving direction and the second camera moving direction. For example, the third camera moving direction is the direction DR3 illustrated in FIG. 5.

According to the above method, it is possible to specify the positioning slit assigned at the boundary between the slit image captured when the imaging section is moved in the first camera moving direction and the slit image captured when the imaging section is moved in the second camera moving direction, for example.

This makes it possible to specify the positioning slit by which the slit image can be synthesized so that the angle of view of the synthesized image is sufficiently larger than the angle of view of the original slit image.

The panoramic image generation section 220 may limit a search range for a position of an overlapping area of the positioning slit and the slit image based on motion information about the imaging section 12 acquired from a motion information acquisition section 16, and may perform the synthesis process.

The term "overlapping area" used herein refers to an area in which two images are made to overlap by the synthesis process. For example, the overlapping area refers to the area REA illustrated in FIG. 6.

The above configuration makes it possible to limit the overlapping area search range to an area around the position estimated based the motion information after the imaging section has been moved, and perform the process that specifies the overlapping area at high speed (i.e., reduce the load of the process that specifies the overlapping area), for example.

Note that estimation in the direction perpendicular to the camera moving direction is not necessarily advantageous taking account of camera shake, the motion of the head, and the like. It may be impossible to specify the overlapping area when camera shake or the like has temporarily occurred to a large extent. Therefore, the panoramic image generation section 220 may limit the search range for the position of the overlapping area of the positioning slit and the slit image based on a horizontal component or a vertical component of the motion information about the imaging section 12 acquired from the motion information acquisition section 16, and may perform the synthesis process.

According to the above configuration, the search range can be limited relative to the positioning slit by utilizing the motion information in the horizontal direction.

In general, a difference in perspective due to motion parallax increases in an area of the still image in the camera moving direction and an area of the still image in the direction opposite to the camera moving direction (i.e., the right end and the left end of the still image, or the upper end and the lower end of the still image). It is desirable that the image used as a material for generating the panoramic image be free from a difference in perspective.

Therefore, the slit image generation section 250 may generate the slit images that have a long side along a direction corresponding to a horizontal component or a vertical component, whichever is smaller in absolute value, of a vector that indicates the camera moving direction.

For example, when the camera moving direction is the direction DR1 in FIG. 4A, the slit image SL1 is generated that has the long side LL1 along the direction DRP1 corresponding to the horizontal component or the vertical component, whichever is smaller in absolute value, of the vector that indicates the direction DR1.

The above configuration makes it possible to generate a slit image that does not include an area of the still image in the camera moving direction and an area of the still image in the direction opposite to the camera moving direction, and suppress the effects of a difference in perspective due to motion parallax, for example.

The slit image generation section 250 may generate the slit images that have the long side along the direction corresponding to the horizontal component or the vertical component, whichever is smaller in absolute value, of the vector that indicates the camera moving direction, and include a center of a still image among the consecutively acquired still images.

For example, when the camera moving direction is the direction DR2 in FIG. 4B, the slit image SL2 is generated that has the long side LL2 along the direction DRP2 corresponding to the horizontal component or the vertical component, whichever is smaller in absolute value, of the vector that indicates the direction DR2, and includes the center CP of the still image SIM2.

The above configuration makes it possible to generate a slit image that does not include an area of the still image in the camera moving direction and an area of the still image in the direction opposite to the camera moving direction, and includes the center of the still image, and further suppress the effects of a difference in perspective due to motion parallax, for example.

The panoramic image generation section 220 may perform the synthesis process of the slit image so that the slit image has an overlapping area with the slit image that was used for a preceding synthesis process in the camera moving direction when the slit image used for the preceding synthesis process was captured to generate the panoramic image.

The above configuration makes it possible to perform the synthesis process while making the generated slit images overlap in the camera motion direction, for example.

The direction determination section 210 may determine whether the camera moving direction is the first camera moving direction, the second camera moving direction, or a third camera moving direction that differs from the first camera moving direction and the second camera moving direction when the imaging section 12 is moved during capture.

The above configuration makes it possible to generate the panoramic image when moving the imaging section along a zigzag path, for example. It is possible to generate a panoramic image over a range wider than the angle of view of the imaging section in a plurality of directions by moving the imaging section along a zigzag path during capture, for example. Moreover, since it is unnecessary to move the imaging section for positioning that adjusts the capture start position in the first camera moving direction and the capture start position in the second camera moving direction, it is possible to reduce the burden imposed on the user, for example. Since the materials for generating the panoramic image can be provided by capturing a movie once, it is possible to reduce the burden imposed on the user, for example.

The panoramic image generation section 220 may perform a process that synthesizes the slit images in the first camera moving direction and a process that synthesizes the slit images in the second camera moving direction in parallel.

According to the above configuration, since the slit images can be synthesized in the second camera moving direction even when the slit images have not been completely synthesized in the first camera moving direction, it is possible to prevent a situation in which the process that synthesizes the slit images in the first camera moving direction becomes a bottleneck, and the panoramic image generation process can be performed at high speed, for example.

The panoramic image generation section 220 may perform the synthesis process of the slit image based on a first error tolerance, and then may perform the synthesis process of the slit image based on a second error tolerance that is lower than the first error tolerance.

The term "error tolerance" used herein refers to a degree by which a shift from the target position of the imaging section is allowed. The term "target position" used herein refers to the position of the imaging section when the imaging section has been moved from the current position in the direction opposite to the direction of the vector indicated by the camera motion direction information (acquired when the imaging section was moved in the first camera moving direction) by an identical distance.

The term "error tolerance" used herein may refer to the tolerance for the ratio of inconsistency of the overlapping area of two slit images. Specific examples of the error tolerance include the tolerance for the difference in position of the pixels within an identical range of the object, and the like.

The first error tolerance refers to a given error tolerance that is higher than the second error tolerance. The second error tolerance refers to a given error tolerance that is lower than the first error tolerance.

According to the above configuration, the overlapping area of the slit image can be specified based on the first error tolerance, and the accuracy of the synthesis position of the slit image can be improved based on the second error tolerance, for example. This makes it possible to generate a panoramic image in which two slit images are made to overlap so that the difference in position of the pixels within an identical range of the object decreases, for example.

The image acquisition section 270 may stop acquisition of the still images when motion information about the imaging section 12 has been acquired from motion information acquisition section 16, and it has been determined that an overlapping area of consecutive slit images among the slit images has not occurred in the synthesis process of the slit image based on the motion information.

The above configuration makes it possible to prevent a situation in which the still images are consecutively acquired although consecutive slit images do not have an overlapping area, and a panoramic image cannot be generated, for example.

The image acquisition section 270 may increase an image acquisition rate so that an overlapping area of consecutive slit images among the slit images is larger than a given threshold value during the synthesis process of the slit image when it has been determined that a camera moving speed has increased based on motion information about the imaging section 12 acquired from a motion information acquisition section 16, the camera moving speed being a moving speed of the imaging section 12.

The term "camera moving speed" used herein refers to the moving speed of the imaging section that is moved by the user.

The term "image acquisition rate" used herein refers to the number of still images acquired per unit time. Specifically, the image acquisition rate refers to the same rate as the shutter speed of the imaging section, a given rate lower than the shutter speed of the imaging section, or the like when the I/F section acquires information including consecutive still images, and refers to the sampling rate of still images from a movie or the like when the I/F section acquires information including a movie.

The above configuration makes it possible to obtain the slit images having an overlapping area necessary for synthesizing the panoramic image.

The image acquisition section 270 may increase the image acquisition rate during the synthesis process performed on the slit image when it has been determined that the camera moving speed (i.e., the moving speed of the imaging section 12) has increased based on the motion information about the imaging section 12 acquired from the motion information acquisition section 16.

For example, when it has been determined that the camera moving speed has increased, the image acquisition rate may be changed to a preset image acquisition rate (sampling rate) that is higher than a normal image acquisition rate (sampling rate).

The slit image generation section 250 may increase a width of the slit image so that an overlapping area of consecutive slit images among the slit images is larger than a given threshold value during the synthesis process of the slit image when it has been determined that a camera moving speed has increased based on motion information about the imaging section 12 acquired from a motion information acquisition section 16, the camera moving speed being a moving speed of the imaging section 12.

The above configuration makes it possible to obtain the slit images having an overlapping area necessary for synthesizing the panoramic image even when the image acquisition rate (sampling rate) cannot be increased due to limitations to the hardware or the network, for example.

The slit image generation section 250 may increase the width of the slit image when it has been determined that the camera moving speed (i.e., the moving speed of the imaging section 12) has increased based on the motion information about the imaging section 12 acquired from the motion information acquisition section 16.

For example, when it has been determined that the camera moving speed has increased, the width of the slit image may be changed to a preset slit width that is larger than a normal slit width.

When the still image capture rate achieved by the imaging device 100 (or the sampling rate of still images from a movie achieved by the imaging device 100 (hereinafter the same)) is higher than the still image acquisition rate achieved by the image acquisition section 270, some of the still images acquired by the imaging device 100 are wasted. When the still image capture rate achieved by the imaging device 100 is lower than the still image acquisition rate achieved by the image acquisition section 270, the image acquisition section 270 cannot acquire a sufficient number of images necessary for generating the panoramic image.

The image acquisition section 270 may control a shutter release timing of the imaging section to consecutively acquire the still images.

The shutter release timing is controlled by outputting information about the sampling rate set by the sampling control section 272 or the like to the imaging device 100. Information about the shutter speed, the shooting (capture) interval, or the like calculated based on the sampling rate may also be output to the imaging device 100.

The above configuration makes it possible to cause the number of still images captured by the imaging section to coincide with the number of still images acquired by the image acquisition section, and cause the image acquisition section to acquire the desired number of still images while preventing a situation in which the imaging section captures unnecessary still images, for example.

The image processing system, the information processing device, and the like according to the embodiments of the invention may be implemented by a program or a computer-readable information storage device that stores the program. In this case, the image processing system, the information processing device, and the like according to the embodiments of the invention are implemented by causing a processor (e.g., CPU) to execute the program. Specifically, the program stored in the information storage device is read from the information storage device, and the processor (e.g., CPU) executes the program read from the information storage device. The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the embodiments of the invention based on the program (data) stored in the information storage device. Specifically, a program that causes a computer (i.e., a device including an operation section, a processing section, a storage section, and an output section) to function as each section according to the embodiments of the invention (i.e., a program that causes a computer to execute the process implemented by each section) is stored in the information storage device.

The image processing system, the information processing device, and the like according to the embodiments of the invention may include a processor and a memory. The processor may be a central processing unit (CPU), for example. Note that the processor is not limited to a CPU. Various types of processors such as a graphics processing unit (GPU) and a digital signal processor (DSP) may also be used. The processor may be a hardware circuit that includes an application specific integrated circuit (ASIC). The memory stores a computer-readable instruction. Each section of the image processing system, the information processing device, and the like according to the embodiments of the invention is implemented by causing the processor to execute an instruction. The memory may be a semiconductor memory (e.g., static random access memory (SRAM) or dynamic random access memory (DRAM)), a register, a hard disk, or the like. The instruction may be an instruction included in an instruction set of a program, or may be an instruction that causes a hardware circuit of the processor to operate.

5. Flow of Process

Figure 16:
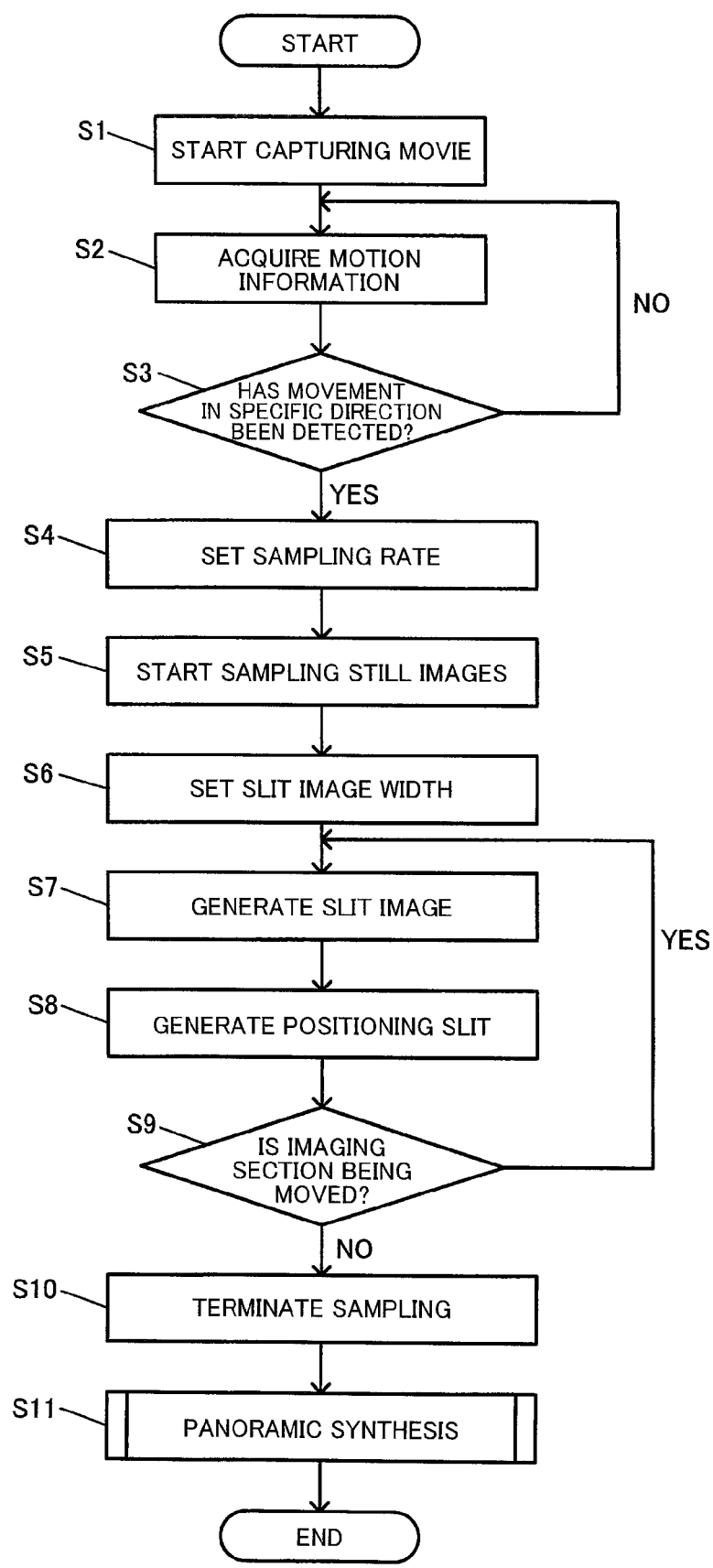
FIG. 16 is a flowchart illustrating the flow of a process according to one embodiment of the invention.
Figure 17:
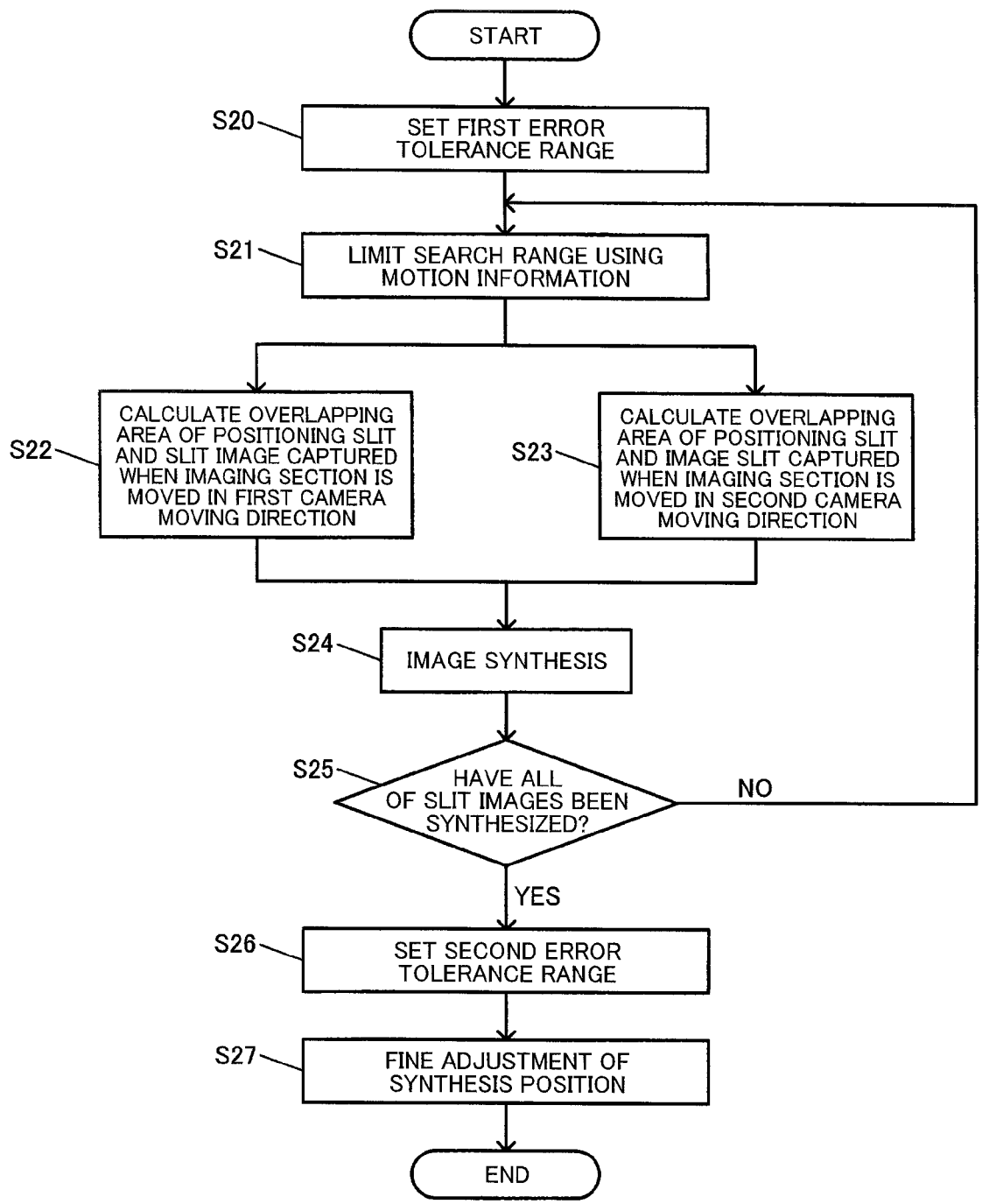
FIG. 17 is a flowchart illustrating the flow of a panoramic synthesis process according to one embodiment of the invention.

The flow of the process according to the embodiments of the invention is described below using the flowcharts illustrated in FIGS. 16 and 17. Note that the flow of the process is described below taking an example in which the panoramic image is generated from a movie. However, the panoramic image need not necessarily be generated from a movie. The panoramic image can also be generated in the same manner as described below when generating the panoramic image from consecutively captured still images.

5.1 Flow of Panoramic Image Generation Process

In a step S1, the user starts capturing a movie. The motion information acquisition section then acquires the motion information (S2). Whether or not the imaging section is being moved in a specific direction is determined based on the acquired motion information (S3). When it has been determined that the imaging section is not being moved in a specific direction, the step S2 is performed again. When it has been determined that the imaging section is being moved in a specific direction, the camera moving speed is calculated based on the motion information, and the sampling rate is set based on the camera moving speed (S4). Still images are sampled from the captured movie based on the sampling rate set in the step S4 (S5).

An optimum slit image width is set based on the motion information so that an overlapping area occurred (S6). A slit image having the slit image width set in the step S6 is extracted from the sampled still image (S7). A positioning slit is generated from the still image (S8).

Whether or not the imaging section is being moved is determined based on the motion information (S9). When it has been determined that the imaging section is being moved, the step S7 is performed again. When it has been determined that the imaging section is not being moved, the still image sampling process is terminated (S10). The panoramic synthesis process is then performed to generate a panoramic image (S11). The details of the panoramic synthesis process are described below.

5.1.1 Flow of Panoramic Synthesis Process

The first error tolerance range is set in a step S20. The overlapping area search range is limited using the motion information (S21).

The overlapping area of the positioning slit and the slit image captured when the imaging section is moved in the first camera moving direction is calculated (S22). The overlapping area of the positioning slit and the slit image captured when the imaging section is moved in the second camera moving direction is calculated in parallel with the step S22 (S22). The slit image is synthesized based on the first error tolerance range (S24).

Whether or not all of the slit images have been synthesized is determined (S25). When it has been determined that all of the slit images have not been synthesized, the step S21 is performed again. When it has been determined that all of the slit images have been synthesized, the second error tolerance range is set (S26). The accuracy of the synthesis position of the slit image is improved based on the second error tolerance range set in the step S26 (S27).

Although only some embodiments of the invention have been described in detail above, those skilled in the art will readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings. The configuration and the operation of the image processing system, the information processing device, and the information storage device are not limited to those described in connection with the above embodiments. Various modifications and variations may be made of the above embodiments.

What is claimed is:

1. An image processing system comprising:
a processor comprising hardware, wherein the processor is configured to:
acquire a plurality of still images captured by an image sensor, wherein a first still image of the plurality of still images is captured as the image sensor is moved in a first moving direction, and a second still image of the plurality of still images is captured as the image sensor is moved in a second moving direction different from the first moving direction;
extract a first silt image from the first still image, wherein the first slit image has a long side along a first slit direction;
extract a second slit image from the second still image, wherein the second slit image has a long side along a second slit direction;
extract a positioning slit from one of the plurality of still images, wherein the positioning slit has a long side along a third slit direction different from the first slit direction and the second slit direction;
determine a first overlapping area between the first slit image and the positioning slit;
determine a second overlapping area between the second slit image and the positioning slit;
determine a third overlapping area between the first overlapping area and the second overlapping area; and
generate a panoramic image based on the first slit image and the second slit image for which the third overlapping area has been determined.

2. A computer-readable storage device with an executable program stored thereon, wherein the program instructs a computer to perform steps of:
acquiring a plurality of still images captured by an image sensor, wherein a first still image of the plurality of still images is captured as the image sensor is moved in a first moving direction, and a second still image of the plurality of still images is captured as the image sensor is moved in a second moving direction different from the first moving direction;
extracting a first silt image from the first still image, wherein the first slit image has a long side along a first slit direction;
extracting a second slit image from the second still image, wherein the second slit image has a long side along a second slit direction;
extracting a positioning slit from one of the plurality of still images, wherein the positioning slit has a long side along a third slit direction different from the first slit direction and the second slit direction;
determining a first overlapping area between the first slit image and the positioning slit;
determining a second overlapping area between the second slit image and the positioning slit;
determining a third overlapping area between the first overlapping area and the second overlapping area; and
generating a panoramic image based on the first slit image and the second slit image for which a third overlapping area has been determined.

3. An image processing method comprising:
acquiring a plurality of still images captured by an image sensor, wherein a first still image of the plurality of still images is captured as the image sensor is moved in a first moving direction, and a second still image of the plurality of still images is captured as the image sensor is moved in a second moving direction different from the first moving direction;
extracting a first silt image from the first still image, wherein the first slit image has a long side along a first slit direction;
extracting a second slit image from the second still image, wherein the second slit image has a long side along a second slit direction;
extracting a positioning slit from one of the plurality of still images, wherein the positioning slit has a long side along a third slit direction different from the first slit direction and the second slit direction;

determining a first overlapping area between the first slit image and the positioning slit;
determining a second overlapping area between the second slit image and the positioning slit;
determining a third overlapping area between the first overlapping area and the second overlapping area; and
generating a panoramic image based on the first slit image and the second slit image for which a third overlapping area has been determined.

\* \* \* \* \*